(12) United States Patent
Bhagavathy et al.

(10) Patent No.: US 8,805,827 B2
(45) Date of Patent: Aug. 12, 2014

(54) CONTENT IDENTIFICATION USING FINGERPRINT MATCHING

(75) Inventors: Sitaram Bhagavathy, Plainsboro, NJ (US); Jeffrey A. Bloom, West Windsor, NJ (US); Dekun Zou, West Windsor, NJ (US); Wen Chen, Kearney, NJ (US)

(73) Assignee: Dialogic (US) Inc., Parsippany, NJ (US)

( * ) Notice: Subject to any disclaimer, the term of this patent is extended or adjusted under 35 U.S.C. 154(b) by 25 days.

(21) Appl. No.: 13/215,402

(22) Filed: Aug. 23, 2011

(65) Prior Publication Data

US 2013/0054645 A1 Feb. 28, 2013

(51) Int. Cl.
*G06F 17/30* (2006.01)

(52) U.S. Cl.
USPC ........... 707/723; 707/706; 707/736; 707/758; 707/771; 707/779

(58) Field of Classification Search
USPC .................. 707/706, 736, 758, 771, 779, 723
See application file for complete search history.

(56) References Cited

U.S. PATENT DOCUMENTS

| 2008/0232439 A1* | 9/2008 | Chen ............................ 375/148 |
| 2012/0078894 A1* | 3/2012 | Jiang et al. .................... 707/723 |

OTHER PUBLICATIONS

Eric H. Kuo Viterbi Sequences and Polytopes Nov. 18, 2004 pp. 1-3.*
J. Lu, "Video fingerprinting for copy identification: from research to industry applications," Proceedings of SPIE, Media Forensics and Security, vol. 7254, 2009.
R. Mohan, "Video sequence matching," Proceedings of International Conference on Acoustics, Speech and Signal Processing (ICASSP), vol. 6, pp. 3697-3700, 1998.
S. Lee, and C. D. Yoo, "Robust video fingerprinting for content-based video identification," IEEE Transactions on Circuits and Systems for Video Technology, vol. 18, No. 7, Jul. 2008.
X.-S. Hua, X. Chen and H.-J. Zhang, "Robust video signature based on ordinal measure," IEEE International Conference on Image Processing (ICIP), vol. 1, pp. 685-688, Oct. 2004.
A. Joly, O. Buisson, and C. Frelicot, "Statistical similarity search applied to content-based video copy detection," Proceedings of the 1st International Workshop on Managing Data for Emerging Multimedia Applications, Tokyo, Japan, Apr. 2005.
N. Gengembre and S. Berrani, "A probabilistic framework for fusing frame-based searches within a video copy detection system," Proceedings of the International Conference on Content-based Image and Video Retrieval (CIVR), 2008.
A. J. Viterbi, "Error bounds for convolutional codes and an asymptotically optimum decoding algorithm," IEEE Transactions on Information Theory 13 (2): 260-269, 1967.
Z. Liu, T. Liu and B. Shahraray, "AT&T Research at TRECVID 2009 content-based copy detection," TRECVID Workshop, 2009.
A. Hampapur and R. M. Bolle, "Videogrep: Video copy detection using inverted file indices," Technical report, IBM research division, 2002.
M. Datar, N, Immorlica, P. Indyk, and V. Morrokni, "Locality-sensitive hashing scheme based on p-stable distributions," Proceedings of the ACM Symposium on Computational Geometry, 2004.

* cited by examiner

*Primary Examiner* — Sana Al Hashemi
(74) *Attorney, Agent, or Firm* — Chapin IP Law, LLC

(57) ABSTRACT

Systems and methods of identifying media content, such as video content, that employ fingerprint matching at the level of video frames. The presently disclosed systems and methods of identifying media content can extract one or more fingerprints from a plurality of video frames included in query video content, and, for each of the plurality of video frames from the query video content, perform frame-level fingerprint matching of the extracted fingerprints against fingerprints extracted from video frames included in a plurality of reference video content. Using the results of such frame-level fingerprint matching, the presently disclosed systems and methods of identifying media content can identify the query content in relation to an overall sequence of video frames from at least one of the plurality of reference content, and/or in relation to respective video frames included in a sequence of video frames from the reference content.

30 Claims, 6 Drawing Sheets

CONTENT IDENTIFICATION USING FINGERPRINT MATCHING

CROSS REFERENCE TO RELATED APPLICATIONS

—Not Applicable—

STATEMENT REGARDING FEDERALLY SPONSORED RESEARCH OR DEVELOPMENT

—Not Applicable—

FIELD OF THE INVENTION

The present application relates generally to systems and methods of identifying media content, and more specifically to systems and methods of identifying media content including, but not being limited to, video content, audio content, image content, and/or text content.

BACKGROUND OF THE INVENTION

Systems and methods of media content identification are known that employ so-called fingerprints extracted from the media content. For example, such systems and methods of media content identification can be used in video quality measurement systems to identify the video content for which the video quality is to be measured. In such systems and methods of media content identification, one or more fingerprints can be extracted from each of a plurality of reference video content items (such content items also referred to herein as a/the "reference content item(s)"), and stored in a database of reference content (such database also referred to herein as a/the "reference content database"). Moreover, one or more fingerprints can be extracted from a portion of query video content (such content also referred to herein as "query content"), and compared with the fingerprints stored in the reference content database. The query content can then be identified based on how well the fingerprints of the query content match the fingerprints stored in the reference content database. For example, fingerprints extracted from the query content or the reference content items can be suitable signatures or identifiers capable of identifying the video content.

In such known systems and methods of media content identification, the fingerprints extracted from the query content and the reference content items can be classified as spatial fingerprints or temporal fingerprints. For example, in the case of video content, one or more spatial fingerprints can be extracted from each video frame of the query content or the reference content items independent of other video frames included in the respective video content. Further, one or more temporal fingerprints can be extracted from two or more video frames of the query content or the reference content items, based on their temporal relationship within the respective video content. Because performing media content identification based solely on spatial fingerprints from a limited number of video frames can sometimes result in incorrect identification of the video content, such systems and methods of media content identification typically seek to enforce a temporal consistency of the results of fingerprint matching to improve the identification of such video content. For example, a shorter term temporal consistency can be enforced by matching the spatial fingerprints of video frames within a temporal window of the video content, and a longer term temporal consistency can be enforced by performing temporal fusion on the results of spatial fingerprint matching.

However, such known systems and methods of media content identification have several drawbacks. For example, such systems and methods of media content identification that seek to enforce a temporal consistency of fingerprint matching can be computationally complex. Further, such systems and methods of media content identification that perform temporal fusion to enforce such a temporal consistency typically use the results of fingerprint matching for a batch of video frames, significantly increasing memory requirements. Such systems and methods of media content identification are therefore generally unsuitable for use in applications that require real-time fingerprint matching against a large database of reference content. Moreover, due to at least their computational complexity and/or increased memory requirements, such systems and methods of media content identification are generally considered to be impractical for use in identifying query content at an endpoint, such as a mobile phone or device.

It would therefore be desirable to have improved systems and methods of media content identification that avoid at least some of the drawbacks of the various known media content identification systems and methods described above.

BRIEF SUMMARY OF THE INVENTION

In accordance with the present application, systems and methods of identifying media content, such as video content, are disclosed that employ fingerprint matching at the level of video frames (such matching also referred to herein as "frame-level fingerprint matching"). The presently disclosed systems and methods of identifying media content can extract one or more fingerprints from a plurality of video frames included in query video content (such content also referred to herein as "query content"), and, for each of the plurality of video frames from the query content, perform frame-level fingerprint matching of the extracted fingerprints against fingerprints extracted from video frames included in a plurality of reference video content items (such content items also referred to herein as a/the "reference content item(s)"). Using at least the results of such frame-level fingerprint matching, the presently disclosed systems and methods of identifying media content can identify the query content in relation to an overall sequence of video frames from at least one of the plurality of reference content items, and/or in relation to respective video frames included in a sequence of video frames from the reference content item.

In accordance with one aspect, an exemplary system for identifying media content (such system also referred to herein as a/the "media content identification system") comprises a plurality of functional components, including a confidence value generator, and at least one data collector/fingerprint extractor. The data collector/fingerprint extractor is operative to receive at least one encoded bitstream from the query content, and to derive, extract, determine, or otherwise obtain characteristic video fingerprint data (such fingerprint data also referred to herein as "query fingerprint(s)") from a plurality of video frames (such frames also referred to herein as "query frame(s)") included in the encoded bitstream of at least a portion of the query content. Such characteristic video fingerprint data can include, but is not limited to, a measure, a signature, and/or an identifier, for one or more video frames. The data collector/fingerprint extractor is further operative to provide the query frames and the corresponding query fingerprints to the confidence value generator. The confidence value generator is operative to access other characteristic video fingerprint data (such fingerprint data also referred to herein as "reference fingerprint(s)") obtained from video frames (such frames also referred to herein as "reference frame(s)")

included in a plurality of reference content items, which are stored in, or otherwise accessible by or from, a database of reference content (such database also referred to herein as a/the "reference content database"). In accordance with an exemplary aspect, the query fingerprints and the reference fingerprints can comprise ordinal measures of predetermined features of the query content and the reference content items, respectively, or any other suitable measures, signatures, or identifiers. The confidence value generator is also operative to perform frame-level fingerprint matching of the query fingerprints against the reference fingerprints. In accordance with another exemplary aspect, such frame-level fingerprint matching can be performed by using an approximate nearest neighbor search technique, such as a locally sensitive hashing algorithm or any other suitable search technique, to access, identify, determine or otherwise obtain one or more reference frames deemed to match the respective query frames, and by determining or otherwise obtaining the distances between the query fingerprints for the respective query frames and the reference fingerprints for the reference frames deemed to match the respective query frames. Based at least on the results of such frame-level fingerprint matching, the confidence value generator is further operative to obtain, for each of at least some of the query frames, reference content information from the reference content database, such information including, but not being limited to, at least one identifier of a reference content item (such identifier also referred to herein as a/the "reference content ID(s)"), and at least one index for at least one reference frame (such index also referred to herein as a/the "reference frame index(es)") associated with the reference content ID. In accordance with another exemplary aspect, by using at least the results of frame-level fingerprint matching, the confidence value generator can conceptually arrange the reference frames deemed to match the respective query frames in a trellis configuration, such that the reference frames corresponding to each query frame are listed in a column, and the reference frames listed in each column represent nodes that may be visited at a given time step in one or more possible sequences of reference frames (such sequences also referred to herein as "reference frame sequence(s)").

In accordance with a further aspect, the media content identification system can use at least the reference frames arranged in the trellis configuration to identify the query content in relation to an overall sequence of reference frames from one of the plurality of reference content items. To such an end, the confidence value generator is operative, for each query frame, to determine the distance between the query fingerprint for the query frame and the reference fingerprint for each reference frame deemed to match the query frame. In accordance with an exemplary aspect, such distances between the query fingerprint and the respective reference fingerprints can be determined by computing, calculating, or otherwise obtaining the distances using at least an Euclidean distance metric, or any other suitable distance metric. The confidence value generator is further operative, for each query frame, to generate a first confidence value (such confidence value also referred to herein as a/the "frame confidence value") for each reference frame listed in the corresponding column based at least on the distance between the query fingerprint for the query frame and the reference fingerprint for the reference frame. Using at least the frame confidence values for the respective reference frames from each column of the trellis configuration, the confidence value generator is further operative to generate, over a predetermined temporal window, a second confidence value (such confidence value also referred to herein as a/the "sequence confidence value") for each of the reference frame sequences that the reference frames are associated with. Moreover, the confidence value generator is operative to generate a content identification report including at least the sequence confidence values, and the reference content IDs for the respective reference frame sequences. In accordance with another exemplary aspect, the confidence value generator is operative to identify the query content in relation to the reference frame sequence having the highest sequence confidence value, and to provide the reference content ID for that reference frame sequence in the content identification report.

In accordance with another aspect, the media content identification system can use the reference frames arranged in the trellis configuration to identify the query content in relation to respective reference frames included in a reference frame sequence. To such an end, the media content identification system further includes another functional component, namely, a sequence detector. In accordance with an exemplary aspect, the sequence detector can be implemented as a Viterbi sequence detector, which is operative to identify the query content in relation to reference frames included in a reference frame sequence, using at least a hidden Markov model that includes a set of states, a set of initial probabilities and a set of transition probabilities for the set of states, a set of observation outputs, and a set of observation probabilities for the set of observation outputs. In accordance with this exemplary aspect, such observation outputs can correspond to the query frames, and such states can correspond to the reference frames that are deemed to match the respective query frames, such matching being based at least on the results of frame-level fingerprint matching. Such states can also correspond to an undefined or otherwise unknown reference frame, $Y_u$, for each query frame, in which an unknown reference frame index, u, is associated with an unknown reference content ID, Y. Further, such initial probabilities can be determined based at least on certain relationships that may exist between indexes of the query frames and the indexes of the reference frames deemed to match the respective query frames, or can be set to a predetermined probability value, such as "1." Moreover, such observation probabilities can be determined based at least on the distances between the query fingerprints for the query frames, and the reference fingerprints for the reference frames deemed to match the respective query frames. In addition, such transition probabilities can be determined in accordance with exemplary transition probabilities, such as those provided in TABLE I below.

TABLE I

| | j | | |
|---|---|---|---|
| i | $N_g$ (M ≠ N) | $M_g$ | $Y_u$ |
| $M_f$ | $p_{MN}$ | trans(f, g) | $p_{ku}$ |
| $Y_u$ | $p_{uk}$ | $p_{uk}$ | $p_{uu'}$ |

With reference to TABLE I above, "i" corresponds to a frame-level fingerprint match between a reference frame and a query frame at a time step, t; "j" corresponds to a frame-level fingerprint match between a reference frame and a query frame at a time step, t+1; "M" and "N" correspond to different reference content IDs; and, "f" and "g" correspond to different reference frame indexes. With further reference to TABLE I above, "$Y_u$" corresponds to an undefined or otherwise unknown reference frame; "$p_{MN}$" corresponds to a transition probability, p, from the reference content ID, M, to the reference content ID, N; "$p_{uk}$" corresponds to a transition probability, p, from an unknown reference content ID, u, to a known reference content ID, k; "$p_{ku}$" corresponds to a transition probability, p, from a known reference content ID, k, to an unknown reference content ID, u; and, "$p_{uu'}$" corresponds to a transition probability, p, from an unknown reference content ID, u, to another unknown reference content ID, u'. In addition, "trans(f, g)" in TABLE I above corresponds to a transition probability from one reference frame index, f, to another reference frame index, g, in which each reference frame index, f, g is associated with the same reference content ID, M.

Using at least the states, the observation outputs, the initial probabilities, the observation probabilities, and the transition probabilities, as set forth above, the Viterbi sequence detector is operative to identify, on a per-frame basis, a reference frame sequence (such frame sequence also referred to herein as a/the "most likely reference frame sequence") including reference frames that match the respective query frames from the query content. To such an end, the Viterbi sequence detector is operative, for each column in the trellis configuration (e.g., from left-to-right), to compute, calculate, determine, or otherwise obtain, for each reference frame listed in the column, the probability of that reference frame being the final frame in the most likely reference frame sequence up to a corresponding time step. The Viterbi sequence detector is further operative, starting from the reference frame in the right-most column having the highest probability of being the final frame in the most likely reference frame sequence, to trace back through the columns of the trellis configuration to identify other reference frames in the respective columns that may be included in the most likely reference frame sequence. Moreover, the Viterbi sequence detector is operative to generate a content identification report including at least the indexes of the reference frames included in the most likely reference frame sequence, and one or more reference content IDs for the most likely reference frame sequence. The Viterbi sequence detector is further operative to identify the query content in accordance with at least the one or more reference content IDs for the most likely reference frame sequence included in the content identification report.

By using at least the results of fingerprint matching at the level of video frames from query content and from one or more reference content items, the presently disclosed systems and methods of identifying media content can identify such query content in relation to an overall sequence of reference frames from a respective reference content item, and/or in relation to respective reference frames included in a sequence of reference frames from the respective reference content item.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which:

FIG. 2c is a flow diagram of an exemplary method of operating the system for identifying media content of FIGS. 1 and 2a;

FIG. 3b is a flow diagram of an exemplary method of operating the system for identifying media content of FIGS. 1 and 3a.

DETAILED DESCRIPTION OF THE INVENTION

Systems and methods of identifying media content, such as video content, are disclosed that employ fingerprint matching at the level of video frames (such matching also referred to herein as "frame-level fingerprint matching"). Such systems and methods of identifying media content can extract one or more fingerprints from a plurality of video frames included in query video content, and, for each of the plurality of video frames from the query video content, perform frame-level fingerprint matching of the extracted fingerprints against fingerprints extracted from video frames included in a plurality of reference video content. Using at least the results of such frame-level fingerprint matching, such systems and methods of identifying media content can beneficially identify the query video content in relation to an overall sequence of video frames from at least one of the plurality of reference video content, and/or in relation to respective video frames included in a sequence of video frames from the reference video content.

Figure 1:
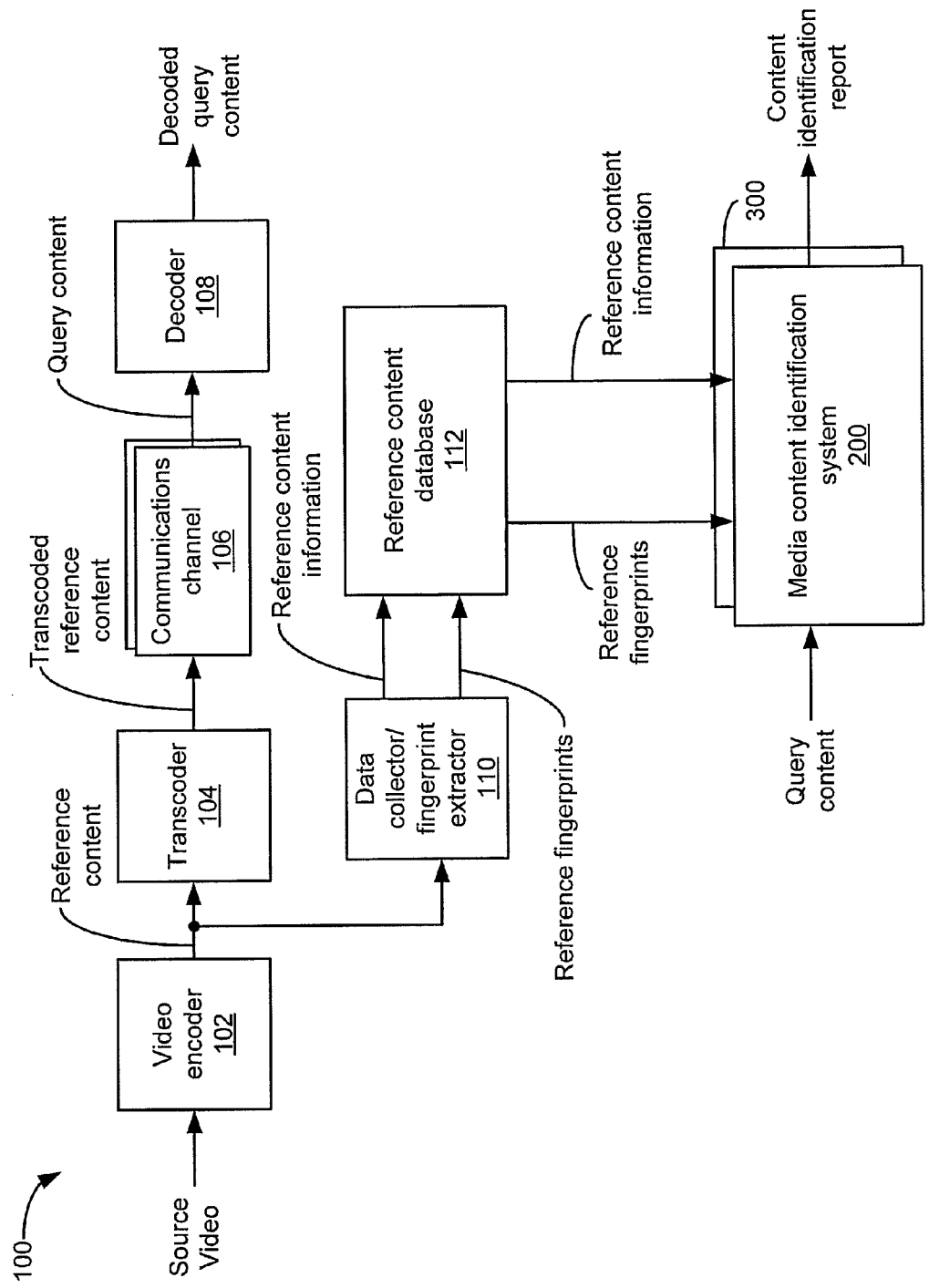
FIG. 1 is a block diagram of an exemplary video communications environment, in which an exemplary system for identifying media content can be implemented, in accordance with an exemplary embodiment of the present application.

FIG. 1 depicts an exemplary video communications environment 100, in which one or more exemplary systems for identifying media content can be implemented, in accordance with the present application. By way of non-limiting example and as shown in FIG. 1, the video communications environment 100 can include a system 200 (also depicted in FIG. 2a) and a system 300 (also depicted in FIG. 3a), wherein such system(s) is/are also referred to herein as a/the "media content identification system(s)".

The exemplary video communications environment 100 includes a video encoder 102, a transcoder 104, at least one communications channel 106, and a decoder 108. The video encoder 102 is operative to generate an encoded bitstream including at least one reference version (such reference version also referred to herein as a/the "reference content item(s)") of query video content (such content also referred to herein as "query content") from at least one source video sequence (such video sequence also referred to herein as a/the "source video"), and to provide the reference content item, compressed according to a first predetermined coding format, to the transcoder 104. For example, the source video can include a plurality of video frames, such as YUV video frames or any other suitable video frames. Further, the source video may include, by way of non-limiting example, one or more of television, motion picture, or other broadcast media video, music video, performance video, training video, webcam video, surveillance video, security video, unmanned aerial vehicle (UAV) video, satellite video, closed circuit video, conferencing video, or any other suitable video. The transcoder 104 is operative to transcode the reference content item into a transcoded version of the reference content item (such content item also referred to herein as a/the "transcoded reference content item(s)"), which is compressed according to a second predetermined coding format that is supported by the communications channel 106. By way of non-limiting example, the first and second predetermined coding formats of the reference content item and the transcoded reference content item, respectively, may be selected from or consistent with the H.263 coding format, the H.264 coding format, the MPEG-2 coding format, the MPEG-4 coding format, and/or any other suitable coding format(s). The transcoder 104 is further operative to provide the transcoded reference content item for transmission over the communications channel 106, which, for example, can be wire-based, optical fiber-based, cloud-based, wireless, or any suitable combination and/or variation thereof. Following its transmission over the communications channel 106, the transcoded reference content item is referred to herein as the "query content." The decoder 108 is operative to receive and to decode the query content, thereby generating a decoded version of the query content (such content also referred to herein as a/the "decoded query content").

As shown in FIG. 1, the video communications environment 100 further includes a data collector/fingerprint extractor 110 and a reference content database 112. The data collector/fingerprint extractor 110 is operative to receive the encoded bitstream from the reference content item. The data collector/fingerprint extractor 110 is further operative to derive, extract, determine, or otherwise obtain characteristic video fingerprint data (such data also referred to herein as "reference fingerprint(s)") from a plurality of video frames (such frames also referred to herein as "reference frame(s)") contained in the encoded bitstream of the reference content item. Such characteristic video fingerprint data can include, but is not limited to, a measure, a signature, and/or an identifier, for one or more video frames. The data collector/fingerprint extractor 110 is further operative to provide the reference fingerprints, and reference content information including, but not being limited to, indexes for the reference frames (such indexes also referred to herein as a/the "reference frame index(es)") from which the reference fingerprints were obtained, and at least one identifier of the reference content item (such identifier also referred to herein as a/the "reference content ID") containing the reference frames, for storage in the reference content database 112. For example, each reference frame index may be implemented as a frame number, a presentation time stamp (such presentation time stamp also referred to herein as a/the "time stamp"), or any other suitable video frame index.

Figure 2A:
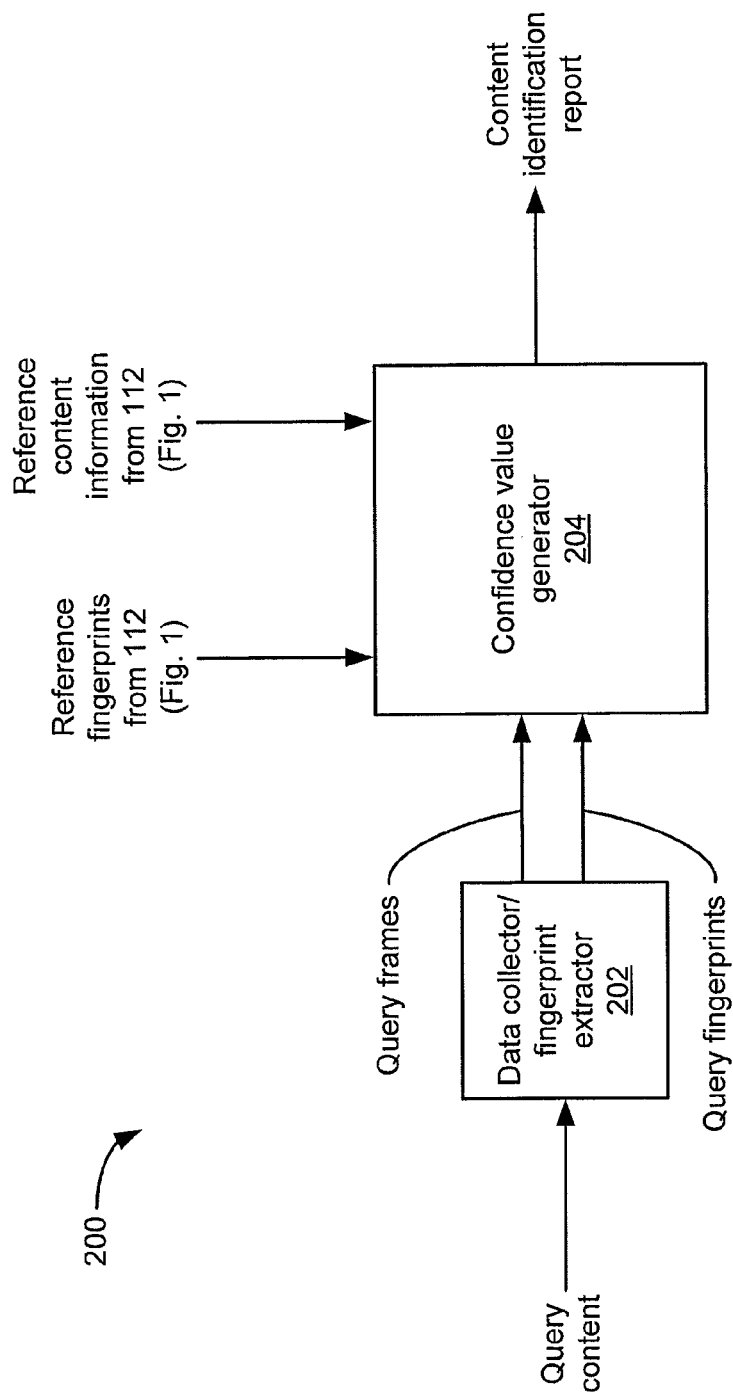
FIG. 2a is a block diagram of an exemplary embodiment of the exemplary system for identifying media content of FIG. 1.

FIG. 2a depicts an illustrative embodiment of a media content identification system 200 that can be implemented within the video communications environment 100 (see FIG. 1). As shown in FIG. 2a, the media content identification system 200 comprises a plurality of functional components, including a data collector/fingerprint extractor 202 and a confidence value generator 204. For example, the data collector/fingerprint extractor 202 can be located at an endpoint such as a mobile phone or device, and the confidence value generator 204 can be located at a distal or geographically remote location from the endpoint, such as within an aggregating server. The data collector/fingerprint extractor 202 is operative to receive at least one encoded bitstream from the query content, and to derive, extract, determine, or otherwise obtain characteristic video fingerprint data (such data also referred to herein as "query fingerprint(s)") from a plurality of video frames contained in the encoded bitstream of at least a portion of the query content. For example, the query fingerprints, as well as the reference fingerprints, can each comprise a vector of ordinal measures of predetermined features of the query content and the reference content items, respectively, or any other suitable measures, signatures, or identifiers. The data collector/fingerprint extractor 202 is further operative to provide the query frames and the corresponding query fingerprints to the confidence value generator 204. The confidence value generator 204 is operative to access the reference fingerprints stored in, or otherwise accessible by or from, the reference content database 112 (see FIG. 1). The confidence value generator 204 is also operative to perform frame-level fingerprint matching of the query fingerprints against the reference fingerprints. For example, such frame-level fingerprint matching can be performed by using an approximate nearest neighbor search technique, such as a locally sensitive hashing algorithm as known to one of ordinary skill in the art, or any other suitable search technique, to access, identify, determine or otherwise obtain one or more reference frames deemed to match the respective query frames, and by determining or otherwise obtaining the distances between the query fingerprints for the respective query frames and the reference fingerprints for the reference frames deemed to match the respective query frames. Based at least on the results of such frame-level fingerprint matching, the confidence value generator 204 is further operative to obtain, from the reference content database 112 and for each of at least some of the query frames, reference content information including, but not being limited to, an indication of at least one reference content ID, and an indication of at least one reference frame index associated with the reference content ID.

In accordance with the illustrative embodiment of FIG. 2a, and using at least the results of frame-level fingerprint matching, the confidence value generator 204 can conceptually arrange the reference frames in a trellis configuration, such that the one or more reference frames that are deemed to match each respective query frame (such deemed matches also referred to herein as "reference frame match(es)") are listed in a column corresponding to that respective query frame, and the one or more reference frames listed in each respective column represent nodes that may be visited at a given time step in one or more possible sequences of reference frames (such sequences also referred to herein as "reference frame sequence(s)").

Figure 2B:
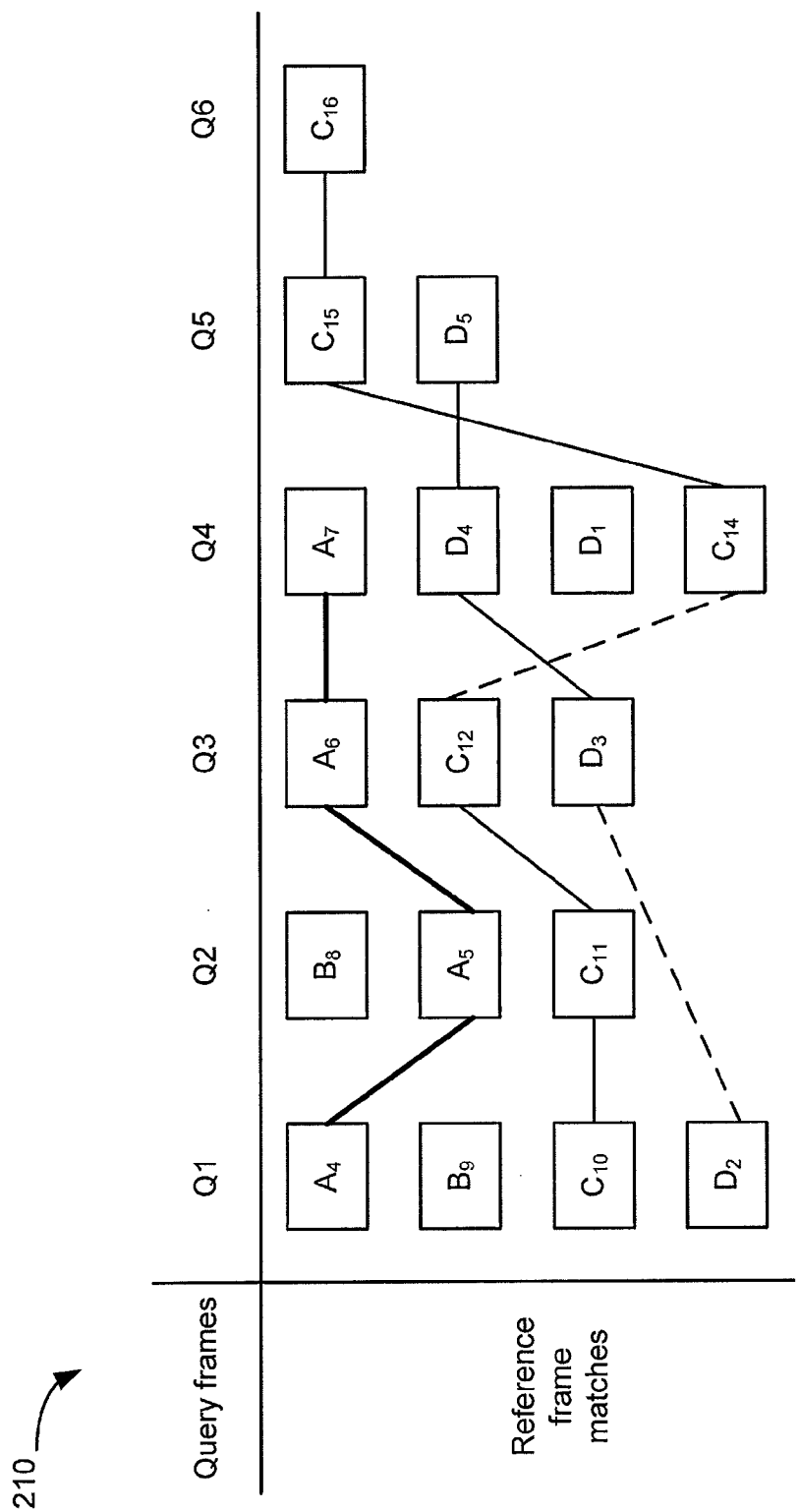
FIG. 2b is a schematic diagram of a plurality of reference video frames arranged in a trellis configuration by the system for identifying media content of FIGS. 1 and 2a, in which the reference frames that are deemed to match respective query frames are listed in respective columns for the respective query frames, and the respective reference frames listed in the respective columns represent nodes that may be visited at a given time step in one or more exemplary sequences of reference video frames.

FIG. 2b depicts an exemplary trellis configuration 210 containing a plurality of exemplary reference frames designated as $A_4$, $A_5$, $A_6$, $A_7$, $B_9$, $B_8$, $C_{10}$, $C_{11}$, $C_{12}$, $C_{14}$, $C_{15}$, $C_{16}$, $D_1$, $D_2$, $D_3$, $D_4$, $D_5$, which reference frames can be conceptually arranged in the trellis configuration by or at least based on the confidence value generator 204 (see FIG. 2a). It is noted that, in each designation of the plurality of reference frames that are shown, the capitalized letter (e.g., A, B, C, D) represents a reference content ID, and the numerical subscript (e.g., 1, 2, 2, etc.) corresponds to a reference frame index. As depicted in FIG. 2b, the reference frames $A_4$, $A_5$, $A_6$, $A_7$, $B_9$, $B_8$, $C_{10}$, $C_{11}$, $C_{12}$, $C_{14}$, $C_{15}$, $C_{16}$, $D_1$, $D_2$, $D_3$, $D_4$, $D_5$ that are deemed to match respective query frames (e.g., query frames Q1, Q2, Q3, Q4, Q5, Q6) are listed in the column(s) for the query frame(s). For example, the reference frames $A_4$, $B_9$, $C_{10}$, $D_2$ that are deemed to match the query frame Q1 are listed in the column of the trellis configuration 210 that corresponds to the query frame Q1. Further, the reference frames $B_8$, $A_5$, $C_{11}$ that are deemed to match the query frame Q2, the reference frames $A_6$, $C_{12}$, $D_3$ that are deemed to match the query frame Q3, the reference frames $A_7$, $D_4$, $D_1$, $C_{14}$ that are deemed to match the query frame Q4, the reference frames $C_{15}$, $D_5$ that are deemed to match the query frame Q5, and the reference frame $C_{16}$ that is deemed to match the query frame Q6, are listed in the respective columns of the trellis configuration 210 that correspond to the respective query frames.

The media content identification system 200 can use at least some of the reference frames arranged in the trellis configuration 210 to identify the query content in relation to an overall sequence of reference frames from one of the plurality of reference content items identified by the reference content IDs A, B, C, D. To such an end, the confidence value generator 204 is operative, for each query frame Q1, Q2, Q3, Q4, Q5, Q6, to determine the distance between the query fingerprint for the query frame and the reference fingerprint for each reference frame deemed to match the query frame. Such distances between the query fingerprint and the respective reference fingerprints can be determined by computing, calculating, or otherwise obtaining the distances using at least an Euclidean distance metric and/or any other suitable distance metric. For example, using the Euclidean distance metric, the confidence value generator 204 can determine each such distance, d, in accordance with equation (1) below, $$d = \left(\sum_{i=1}^{M} |p_i - q_i|^2\right)^{1/2}, \quad (1)$$

in which "p," "q," and "M" are variables defined such that p and q correspond to two points in an M-dimensional space, $R^M$. With reference to the exemplary trellis configuration 210 of FIG. 2b, the confidence value generator 204 is operative to determine the distance between the query fingerprint for the query frame Q1 and the reference fingerprint for each reference frame $A_4$, $B_9$, $C_{10}$, $D_2$, to determine the distance between the query fingerprint for the query frame Q2 and the reference fingerprint for each reference frame $B_8$, $A_5$, $C_{11}$, to determine the distance between the query fingerprint for the query frame Q3 and the reference fingerprint for each reference frame $A_6$, $C_{12}$, $D_3$, to determine the distance between the query fingerprint for the query frame Q4 and the reference fingerprint for each reference frame $A_7$, $D_4$, $D_1$, $C_{14}$, to determine the distance between the query fingerprint for the query frame Q5 and the reference fingerprint for each reference frame $C_{15}$, $D_5$, and to determine the distance between the query fingerprint for the query frame Q6 and the reference fingerprint for the reference frame $C_{16}$.

With further reference to the exemplary trellis configuration 210 of FIG. 2b, the confidence value generator 204 is operative, for each query frame Q1, Q2, Q3, Q4, Q5, Q6, to generate a first confidence value (such confidence value also referred to herein as a/the "frame confidence value") for each reference frame listed in the same column as the query frame, based at least on the distance between the query fingerprint for the query frame and the reference fingerprint for the reference frame. Using at least the distances determined in accordance with equation (1) above, the confidence value generator 204 can compute, calculate, determine, or otherwise obtain each frame confidence value, $p_{s,i}$ in accordance with equation (2) below, $$p_{s,i} = e^{-\alpha d_{s,i}}, \quad (2)$$

in which "$\alpha$" is a predetermined parameter, and "$d_{s,i}$" corresponds to the distance, as determined in accordance with equation (1) above, between the query fingerprint for the query frame Qi and the reference fingerprint for a respective one of the reference frames deemed to match the query frame Qi. In accordance with equation (2) above, such a respective reference frame deemed to match the query frame Qi is included in a reference content item having a reference content ID, s. For example, with reference to equation (2) above, the predetermined parameter a can be set to 0.5, or any other suitable parameter value. Moreover, with reference to the reference frames included in the trellis configuration 210, the query frame Qi can correspond to the query frame Q1, Q2, Q3, Q4, Q5, or Q6, and the reference content ID s can correspond to the reference content ID A, B, C, or D.

In accordance with the illustrative embodiment of FIG. 2a and the exemplary trellis configuration 210 of FIG. 2b, if no reference frames from the reference content item having the reference content ID A, B, C, or D are deemed to match the query frame Q1, Q2, Q3, Q4, Q5, or Q6, then the frame confidence value $p_{s,i}$ from equation (2) above can be set to "0." For example, as shown in FIG. 2b, no reference frames from the reference content item having D as a reference content ID are deemed to match the query frame Q2. The frame confidence value $p_{D,2}$ from equation (2) above can therefore be set to "0." Further, if a single reference frame from the reference content item having the reference content ID A, B, C, or D is deemed to match the query frame Q1, Q2, Q3, Q4, Q5, or Q6, then the distance $d_{s,i}$ from equation (2) above can be determined by computing, calculating, or otherwise obtaining such a distance between the reference frame match and the query frame Q1, Q2, Q3, Q4, Q5, or Q6. Moreover, if more than one reference frame from the reference content item having the reference content ID A, B, C, or D are deemed to match the query frame Q1, Q2, Q3, Q4, Q5, or Q6, then the distance can be computed, calculated, determined, or otherwise obtained between each reference frame match and the query frame Q1, Q2, Q3, Q4, Q5, or Q6, and the distance $d_{s,i}$ from equation (2) above can ultimately be set to the smaller or the smallest of the obtained distances. In one or more alternative embodiments, the distance $d_{s,i}$ from equation (2) above can be set to the average of the distances between the respective reference frame matches and the query frame Q1, Q2, Q3, Q4, Q5, or Q6. For example, as shown in FIG. 2b, the two reference frames $D_1$ and $D_4$ from the reference content item having D as a reference content ID are deemed to match the query frame Q4. If the distance between the reference frame $D_4$ and the query frame Q4 was smaller than the distance between the reference frame $D_1$ and the query frame Q4, then the distance $d_{D,4}$ from equation (2) above may be set to the smaller of the two distances, or the average of the two distances.

It is noted that each of the reference frames included in the trellis configuration 210 (see FIG. 2b) may be associated with a reference frame sequence. For example, with reference to the column of the trellis configuration 210 that corresponds to the query frame Q1, the reference frame $A_4$ is associated with a reference frame sequence that includes the reference frames $A_4$, $A_5$, $A_6$, $A_7$; the reference frame $C_{10}$ is associated with a reference frame sequence that includes the reference frames $C_{10}$, $C_{11}$, $C_{12}$, $C_{14}$, $C_{15}$, $C_{16}$; and, the reference frame $D_2$ is associated with a reference frame sequence that includes the reference frames $D_2$, $D_3$, $D_4$, $D_5$. As shown in FIG. 2b, the four successive reference frames $A_4$, $A_5$, $A_6$, $A_7$ included in the reference frame sequence corresponding to the A reference content ID (such reference frame sequence also referred to herein as "reference frame sequence A") are interconnected by solid line segments. Because there is an interruption in the reference frame sequence corresponding to the C reference content ID (such reference frame sequence also referred to herein as "reference frame sequence C") between the reference frames $C_{12}$ and $C_{14}$, the reference frames $C_{12}$, $C_{14}$ are interconnected by a dashed line segment, as depicted in FIG. 2b. Otherwise, the three successive reference frames $C_{10}$, $C_{11}$, $C_{12}$, and the three successive reference frames $C_{14}$, $C_{15}$, $C_{16}$, included in the reference frame sequence C, are interconnected by solid line segments, as depicted in FIG. 2b. Moreover, because there is an interruption in the reference frame sequence corresponding to the D reference content ID (such reference frame sequence also referred to herein as "reference frame sequence D"), due to the reference frame $D_1$ being disposed out-of-sequence in the same column as the reference frame $D_4$, the reference frames $D_2$, $D_3$ are interconnected by a dashed line segment, as depicted in FIG. 2b. Otherwise, the three successive reference frames $D_3$, $D_4$, $D_5$ included in the reference frame sequence D are interconnected by solid line segments. It is also noted that the reference frame $B_9$ in the column of the trellis configuration 210 that corresponds to the query frame Q1, and the reference frame $B_8$ in the column that corresponds to the query frame Q2, are not interconnected by any line segment. This is because the reference frames $B_9$, $B_8$ do not appear in the trellis configuration 210 in increasing, consecutive order.

Using at least the frame confidence values for the respective reference frames from each column of the trellis configuration 210, the confidence value generator 204 is operative to generate, over a predetermined temporal window, a second confidence value (such confidence value also referred to herein as a/the "sequence confidence value") for each of the reference frame sequences that the reference frames are associated with. For example, for a predetermined temporal window corresponding to N successive query frames, Q1, Q2, . . . , QN, the confidence value generator 204 can compute, calculate, determine, or otherwise obtain, for each reference frame sequence, a sequence confidence value, $C_{s,N}$, in accordance with equation (3) below, $$C_{s,N} = \frac{1}{N}\sum_{i=1}^{N} p_{s,i}, \quad (3)$$

in which "s" corresponds to the reference content ID (e.g., A, B, C, D) for the reference frame sequence, and "$p_{s,i}$" corresponds to the frame confidence values for the respective reference frames included in the reference frame sequence, as determined in accordance with equation (2) above. For example, using equation (3) above, for a predetermined temporal window corresponding to the six successive query frames, Q1, Q2, Q3, Q4, Q5, Q6 (e.g., N=6), the sequence confidence value, $C_{A,6}$, can be determined for the reference frame sequence A, which includes the reference frames $A_4$, $A_5$, $A_6$, $A_7$. With reference to the trellis configuration 210 of FIG. 2b, it is noted that the reference frame $A_4$ is a reference frame match for the query frame Q1. Further, the reference frame $A_5$ is a reference frame match for the query frame Q2; the reference frame $A_6$ is a reference frame match for the query frame Q3; and, the reference frame $A_7$ is a reference frame match for the query frame Q4. However, there are no reference frame matches in the reference frame sequence A for the query frames $Q_5$ and $Q_6$. Accordingly, when determining the sequence confidence value $C_{A,6}$ using equation (3) above, the frame confidence values, $p_{A,5}$, $p_{A,6}$, can each be set to "0."

In further accordance with the illustrative embodiment of FIG. 2a, the confidence value generator 204 is operative to generate a content identification report including at least the sequence confidence value, and the reference content ID, for each of the reference frame sequences. For example, such a content identification report can include the sequence confidence values $C_{A,6}$, $C_{B,6}$, $C_{C,6}$, $C_{D,6}$, and the reference content IDs A, B, C, D, respectively, for the reference frame sequences A, B, C, D. Further, the sequence confidence values $C_{A,6}$, $C_{B,6}$, $C_{C,6}$, $C_{D,6}$ for the reference frame sequences A, B, C, D, respectively, can be presented in the content identification report in descending order, or in any other useful format. Moreover, the confidence value generator 204 can identify the query content in relation to the reference frame sequence A, B, C, or D having the highest sequence confidence value $C_{A,6}$, $C_{B,6}$, $C_{C,6}$, or $C_{D,6}$, and provide the reference content ID A, B, C, or D for that reference frame sequence as an identifier of the query content in the content identification report. It is noted that any other suitable information, presented in any other useful format, may be provided in such a content identification report for use in identifying the query content.

The operation of the confidence value generator 204, as illustrated in FIG. 2a, is further described below with reference to the following illustrative example and the exemplary trellis configuration 210 (see FIG. 2b). In this illustrative example, the confidence value generator 204 receives, from the data collector/fingerprint extractor 202, two query frames Q1, Q2, a query fingerprint obtained from the query frame Q1, and a query fingerprint obtained from the query frame Q2. The confidence value generator 204 accesses reference fingerprints stored in, or otherwise accessible by or from, the reference content database 112 (see FIG. 1), and performs frame-level fingerprint matching of the query fingerprints against the reference fingerprints. Based at least on the results of such frame-level fingerprint matching, the confidence value generator 204 obtains from the reference content database 112, for each of the query frames Q1, Q2, reference content information including, but not being limited to, an indication of at least one reference content ID, and an indication of at least one reference frame index associated with the reference content ID. In accordance with the trellis configuration 210 of FIG. 2b, the reference frame matches for the query frame Q1 can include the reference frames $A_4$, $B_9$, $C_{10}$, $D_2$, and the reference frame matches for the query frame Q2 can include the reference frames $B_8$, $A_5$, $C_{11}$. In accordance with equation (1) above, the confidence value generator 204 determines the distances between the query fingerprint for the query frame Q1, and the reference fingerprints for the reference frame matches $A_4$, $B_9$, $C_{10}$, $D_2$. For example, such distances between the query fingerprint for the query frame Q1, and the reference fingerprints for the reference frame matches $A_4$, $B_9$, $C_{10}$, $D_2$, may be 0.1, 0.2, 0.3, 0.4, respectively, or any other possible distance values. Using at least such distance values 0.1, 0.2, 0.3, 0.4 between the query fingerprint and the respective reference fingerprints, the confidence value generator 204 obtains the frame confidence values $p_{A,1}$, $p_{B,1}$, $p_{C,1}$, $p_{D,1}$, in accordance with equation (2) above, as follows, $$p_{A,1}=e^{-\alpha 0.1}, p_{B,3}=e^{-\alpha 0.2}, p_{C,3}=e^{-\alpha 0.3}, p_{D,3}=e^{-\alpha 0.4}. \quad (4)$$

In further accordance with equation (1) above, the confidence value generator 204 determines the distances between the query fingerprint for the query frame Q2, and the reference fingerprints for the reference frame matches $B_8$, $A_5$, $C_{11}$. For example, such distances between the query fingerprint for the query frame Q2, and the respective reference fingerprints for the reference frame matches $B_8$, $A_5$, $C_{11}$, may be 0.1, 0.2, 0.3, respectively, or any other possible distance values. Using at least such distance values 0.1, 0.2, 0.3 between the query fingerprint and the respective reference fingerprints, the confidence value generator 204 obtains the frame confidence values $p_{A,2}$, $p_{B,2}$, $p_{C,2}$, in accordance with equation (2) above, as follows, $$p_{A,2}=e^{-\alpha 0.1}, p_{B,2}=e^{-\alpha 0.2}, p_{C,2}=e^{-\alpha 0.3}, \quad (5)$$

Moreover, the confidence value generator 204 obtains, for a predetermined temporal window corresponding to the two successive query frames Q1, Q2 (e.g., N=2), sequence confidence values $C_{A,2}$, $C_{B,2}$, $C_{C,2}$, $C_{D,2}$, for the reference frame sequences A, B, C, D, respectively, in accordance with equations (6) through (9) below, $$C_{A,2} = \frac{1}{2}(p_{A,1} + p_{A,2}), \quad (6)$$

$$C_{B,2} = \frac{1}{2}(p_{B,1} + p_{B,2}), \quad (7)$$

$$C_{C,2} = \frac{1}{2}(p_{C,1} + p_{C,2}), \quad (8)$$

$$C_{D,2} = \frac{1}{2}(p_{D,1} + p_{D,2}). \quad (9)$$

It is noted that, in this example, it is assumed that $$C_{A,2} > C_{B,2} > C_{C,2} > C_{D,2}. \quad (10)$$

Further, the confidence value generator 204 identifies the query content in relation to the reference frame sequence A, B, C, or D having the highest sequence confidence value $C_{A,2}$, $C_{B,2}$, $C_{C,2}$, or $C_{D,2}$, which in the case of this example is the reference content item having the reference content ID A. The confidence value generator 204 then provides the reference content ID A for the reference frame sequence A as the identifier of the query content in the content identification report.

Figure 2C:
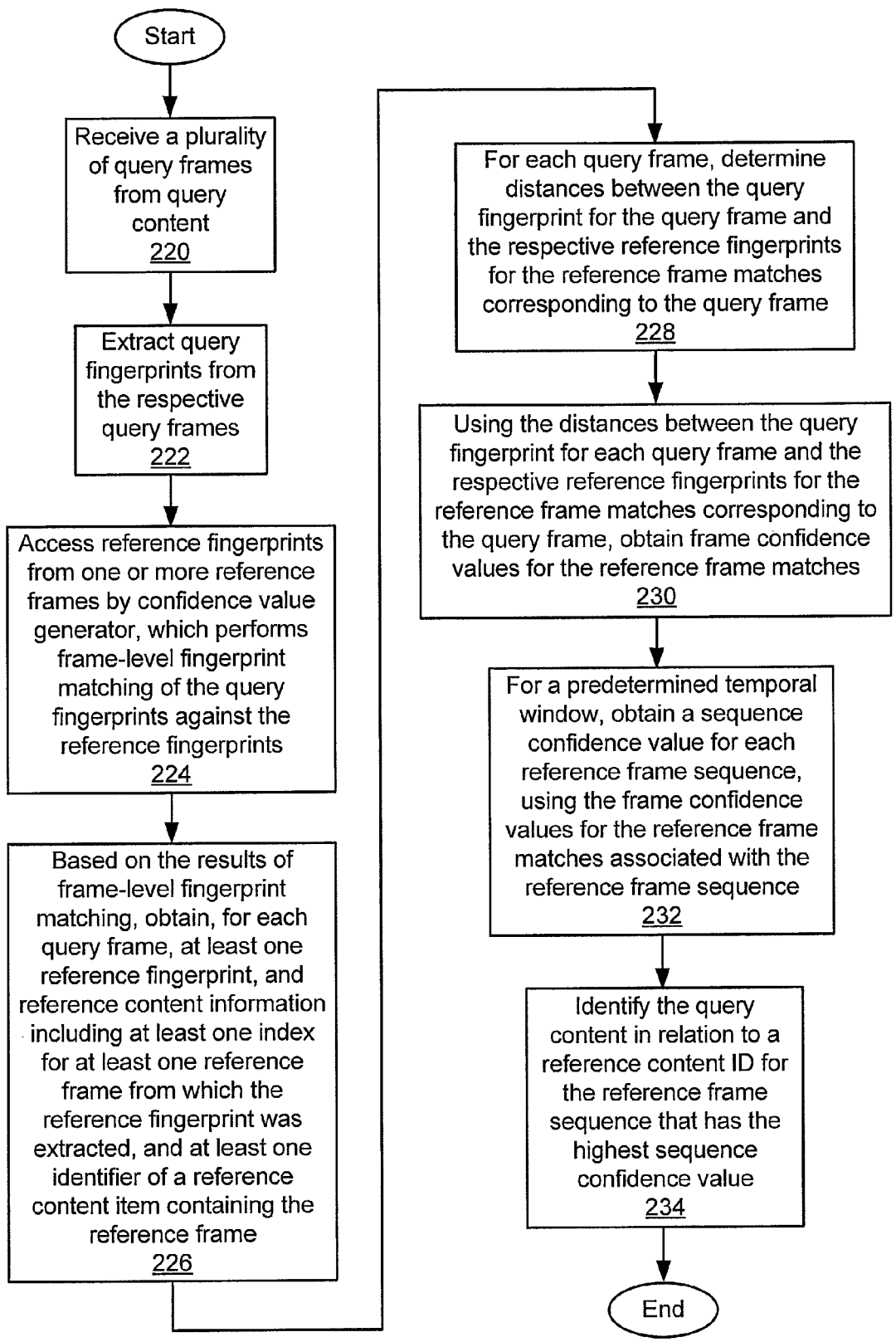

An exemplary method of operating the media content identification system 200 of FIG. 2a is described below with reference to FIG. 2c, as well as FIGS. 1 and 2a. As depicted in step 220 (see FIG. 2c), a plurality of query frames from query content are received at the data collector/fingerprint extractor 202 (see FIG. 2a). As depicted in step 222 (see FIG. 2c), query fingerprints are extracted from the respective query frames by the data collector/fingerprint extractor 202. As depicted in step 224 (see FIG. 2c), reference fingerprints obtained from one or more reference frames, and stored in or otherwise accessible by or from the reference content database 112 (see FIG. 1), are accessed by the confidence value generator 204, which performs frame-level fingerprint matching of the query fingerprints against reference fingerprints. As depicted in step 226 (see FIG. 2c), based on the results of frame-level fingerprint matching, at least one reference fingerprint, and reference content information including at least one index for at least one reference frame from which the reference fingerprint was extracted, and at least one identifier of a reference content item containing the reference frame, are obtained for each query frame from the reference content database 112 by the confidence value generator 204. As depicted in step 228 (see FIG. 2c), distances are determined, by the confidence value generator 204, between the query fingerprint for each query frame and the respective reference fingerprints for the reference frame matches corresponding to the query frame. As depicted in step 230 (see FIG. 2c), using at least the distances between the query fingerprint for each query frame and the respective reference fingerprints for the reference frame matches corresponding to the query frame, frame confidence values are obtained for the reference frame matches by the confidence value generator 204, each of at least some of the reference frame matches being associated with a reference frame sequence. As depicted in step 232 (see FIG. 2c), for a predetermined temporal window, sequence confidence values are obtained for the respective reference frame sequences by the confidence value generator 204, using at least the frame confidence values for the reference frame matches associated with the reference frame sequences. As depicted in step 234 (see FIG. 2c), the query content is identified, by the confidence value generator 204, in relation to the reference content ID for the reference frame sequence that has the highest sequence confidence value.

Figure 3A:
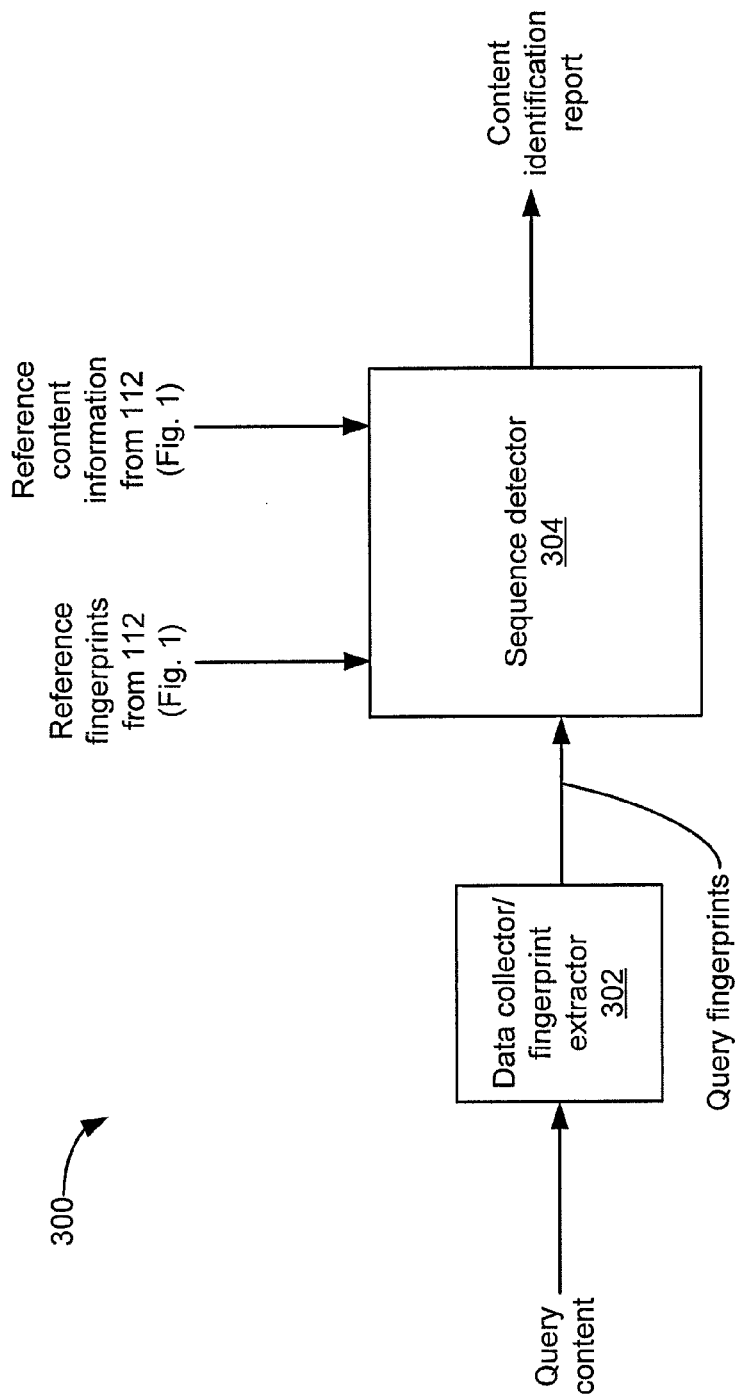
FIG. 3a is a block diagram of an exemplary alternative embodiment of the system for identifying media content of FIG. 1.

FIG. 3a depicts an illustrative embodiment of the media content identification system 300, which can use the reference frames arranged in the trellis configuration 210 (see FIG. 2b) to identify query content in relation to one or more reference frames included in a reference frame sequence. To such an end, the media content identification system 300 includes a plurality of functional components, namely, a data collector/fingerprint extractor 302, and a sequence detector 304. For example, the data collector/fingerprint extractor 302 can be located at an endpoint such as a mobile phone or device, and the sequence detector 304 can be located at a distal or geographically remote location from the endpoint, such as within an aggregating server. It is noted that the media content identification system 300 can be implemented within the video communications environment 100 (see FIG. 1) in place of, or in addition to, the media content identification system 200 (see FIG. 2a).

In accordance with the illustrative embodiment of FIG. 3a, the sequence detector 304 can be implemented as a Viterbi sequence detector, or any other suitable sequence detector. Such a Viterbi sequence detector generally operates as follows. Using at least a hidden Markov model that includes a set of states, $Y=\{y_1, \ldots, y_t\}$, a set of probabilities, $\pi_i$, of initially being in a state, i (such set of probabilities also referred to herein as a/the "set of initial probabilities"), a set of probabilities, $a_{i,j}$, of transitioning from the state i to a state j (such set of probabilities also referred to herein as a/the "set of transition probabilities"), and given a set of observation outputs, $X=\{x_1, \ldots, x_t\}$, such a Viterbi sequence detector can determine the probability, $V_{t,k}$, of a state sequence, $y_1, \ldots, y_t$, that is most likely to have produced the observation outputs $x_1, \ldots, x_t$, in accordance with equations (11) and (12) below, $$V_{1,k} = P(x_1 \mid k)\pi_k, \quad (11)$$

and $$V_{t,k} = P(x_t \mid k)\max_{y \in Y}(a_{y,k}, V_{t-1,y}), \quad (12)$$

in which "k" represents the final state of the state sequence $y_1, \ldots, y_t$ up to a corresponding time step, $t=1, \ldots, T$. Such a Viterbi sequence detector can determine the state sequence $y_1, \ldots, y_t$ by saving back pointers for use in remembering which state, y, was used in equation (12) above. Using at least the probabilities $V_{t,k}$, such a Viterbi sequence detector can determine the state sequence $y_1, \ldots, y_t$, in accordance with equations (13) and (14) below, $$y_T = \arg\max_{y \in Y}(V_{T,y}), \text{ and} \quad (13)$$

$$y_{t-1} Ptr(y_t, t), \quad (14)$$

in which "$Ptr(y_t, t)$" is a function that is operative to return the value of the state, $y_{t-1}$, used to compute $V_{t,k}$ if t>1, or the value of the state, $y_t$, if t=1. It is noted that a confidence value, $C_T$, for such a state sequence $y_1, \ldots, y_t$ that is most likely to have produced the observation outputs $x_1, \ldots, x_t$ can be computed, calculated, determined, or otherwise obtained, in accordance with equation (15) below, $$C_T = \max_y V_{T,y}, \quad (15)$$

In further accordance with the illustrative embodiment of FIG. 3a, the sequence detector 304, implemented as a Viterbi sequence detector, is operative to identify query content in relation to reference frames included in a reference frame sequence, using at least a hidden Markov model that includes a set of states, a set of initial probabilities and a set of transition probabilities for the set of states, a set of observation outputs, and a set of observation probabilities for the set of observation outputs. For example, such observation outputs can correspond to the query frames included in the query content, and such states can correspond to the reference frames that are deemed to match the respective query frames, such matching being based at least on the results of frame-level fingerprint matching. Such states can also correspond to an undefined or otherwise unknown reference frame, $Y_u$, for each query frame, in which an unknown reference frame index, u, is associated with an unknown reference content ID, Y. Such unknown reference frames $Y_u$ can be used to handle non-existent reference frame matches, missing reference frame matches, and/or ambiguity. For example, such non-existent reference frame matches can correspond to reference frames that would otherwise be deemed to match respective query frames as a result of frame-level fingerprint matching, but are not currently stored in the reference content database 112 (see FIG. 1). Further, such missing reference frame matches can correspond, for example, to reference frames that would otherwise be deemed to match respective query frames, and may be currently stored in the reference content database 112, but are not successfully located in the reference content database 112 during frame-level fingerprint matching. Moreover, such ambiguity can arise, for example, when there are multiple, similar, reference frame matches for a particular query frame.

Further, such initial probabilities can be considered to have the same probability values, such as "1," for all of the states included in the hidden Markov model employed by the sequence detector 304. For example, all possible reference frame matches for a particular query frame can be considered to be equally probable. In one or more alternative embodiments, such initial probabilities can be determined based at least in part on certain relationships that may exist between the indexes of the query frames, and the indexes of the reference frame matches for the query frames. For example, if a first query frame has an index equal to "0," and the reference frame matches for the first query frame likewise have indexes equal to "0," then such initial probabilities can be considered to have higher probability values for states with reference frame indexes that are equal to the index of the first query frame.

Moreover, such observation probabilities can be determined based at least in part on the distances between the query fingerprints for the query frames, and the reference fingerprints for the respective reference frame matches. For example, such observation probabilities, $P(x_t|k)$, can be expressed as follows, $$P(x_t | k) = \begin{cases} \frac{1}{K} e^{-\alpha d(x_t, F(k))}, & k = M_f \\ \frac{1}{K} e^{-\alpha D}, & k = Y_u, \end{cases} \quad (16)$$

in which "$x_t$" is a query fingerprint vector associated with a query frame, Qt, that can be expressed as $$x_t = F(Qt), \quad (17)$$

in which "k" corresponds to a reference frame match for the query frame Qt, "K" is a predetermined normalization factor, "$d(x_t, F(k))$" corresponds to the Euclidean distance between the query fingerprint vector $x_t$ and the reference fingerprint vector, F(k), "D" is a predetermined distance value, "α" is a predetermined parameter that controls the rate at which the observation probabilities $P(x_t|k)$ decrease with the distance $d(x_t, F(k))$, "$M_f$" corresponds to a known reference frame match having a reference content ID, M, and a reference frame index, f, and "$Y_u$" corresponds to an undefined or otherwise unknown reference frame match. For example, with reference to equation (16) above, the predetermined normalization factor, K, can be set to "1" or any other suitable factor value, the predetermined distance value, D, can be set to 5 or any other suitable distance value, and the predetermined parameter, α, can be set to 0.5 or any other suitable parameter value.

In addition, such transition probabilities can be determined in accordance with exemplary transition probabilities, such as those provided in TABLE II below.

TABLE II

| | j | | |
|---|---|---|---|
| i | $N_g$ (M ≠ N) | $M_g$ | $Y_u$ |
| $M_f$ | $p_{MN}$ | trans(f, g) | $p_{ku}$ |
| $Y_u$ | $p_{uk}$ | $p_{uk}$ | $p_{uu'}$ |

With reference to TABLE II above, "i" corresponds to a frame-level fingerprint match between a reference frame and a query frame at a time step, t; "j" corresponds to a frame-level fingerprint match between a reference frame and a query frame at a time step, t+1; "M" and "N" correspond to different reference content IDs; and, "f" and "g" correspond to different reference frame indexes. With further reference to TABLE II above, "$Y_u$" corresponds to an unknown reference frame; "$p_{MN}$" corresponds to a transition probability, p, from the reference content ID, M, to the reference content ID, N; "$p_{uk}$" corresponds to a transition probability, p, from an unknown reference content ID, u, to a known reference content ID, k; "$p_{ku}$" corresponds to a transition probability, p, from a known reference content ID, k, to an unknown reference content ID, u; and, "$p_{uu'}$" corresponds to a transition probability, p, from an unknown reference content ID, u, to another unknown reference content ID, u'. In addition, "trans(f, g)" in TABLE II above corresponds to a transition probability from one reference frame index, f, to another reference frame index, g, in which each reference frame index f, g is associated with the same reference content ID, M.

For example, with reference to TABLE II above, for a transition probability, $a_{i,j}$, $$\text{if } i = Y_u \text{ and } j = Y^{u'}, \text{ then } a_{i,j} = p_{uu'}, \quad (18)$$

in which "$p_{uu'}$" corresponds to the transition probability from an unknown reference frame, $Y_u$, to another unknown reference frame, $Y_{u'}$. Further, $$\text{if } i = Y_u \text{ and } j = M_f, \text{ then } a_{i,j} = p_{uk}, \quad (19)$$

in which "$p_{uk}$" corresponds to the transition probability from an unknown reference frame, $Y_u$, to a known reference frame, $M_f$. Still further, $$(20) \quad \text{if } i = M_f \text{ and } j = Y_u, \text{ then } a_{i,j} = p_{ku},$$

in which "$p_{ku}$" corresponds to the transition probability from a known reference frame, $M_f$, to an unknown reference frame, $Y_u$. Moreover, $$\text{if } i=M_f, j=N_g, \text{ and } M \neq N, \text{ then } a_{i,j}=p_{MN}, \qquad (21)$$

in which "$p_{MN}$" corresponds to the transition probability from one reference content ID, M, to another reference content ID, N. It is noted that, because the reference content ID typically does not change frequently from one reference frame to the next reference frame, the transition probability $p_{MN}$ typically has a relatively small value. In addition, $$\text{if } i=M_f \text{ and } j=M_g, \text{ then } a_{i,j}=\text{trans}(f,g), \qquad (22)$$

in which "trans(f, g)" corresponds to the transition probability from one reference frame index, f, to another reference frame index, g, in which each reference frame index f, g is associated with the same reference content ID, M.

In accordance with the illustrative embodiment of FIG. 3a and the exemplary trellis configuration 210 of FIG. 2b, the sequence detector 304 is operative to identify, on a per-frame basis, a reference frame sequence (such frame sequence also referred to herein as a/the "most likely reference frame sequence") including reference frames that match the respective query frames Q1, Q2, Q3, Q4, Q5, Q6, using at least the set of states, and the set of initial probabilities, the set of observation probabilities, and the set of transition probabilities, as set forth above. To such an end, the sequence detector 304 is operative, for each column in the trellis configuration 210, to compute, calculate, determine, or otherwise obtain, for each reference frame listed in the column, the probability of that reference frame being the final frame in the most likely reference frame sequence up to a corresponding time step. The sequence detector 304 is further operative, starting from the reference frame in the column corresponding to the query frame Q6 that has the highest probability of being the final frame in the most likely reference frame sequence, to trace back through the columns of the trellis configuration 210 to identify other reference frames in the respective columns that may be included in the most likely reference frame sequence. Moreover, the sequence detector 304 is operative to generate a content identification report including at least the indexes of the reference frames included in the most likely reference frame sequence, and one or more reference content IDs for the most likely reference frame sequence. The sequence detector 304 is further operative to identify the query content in accordance with at least the one or more reference content IDs for the most likely reference frame sequence included in the content identification report. It is noted that any other suitable information, presented in any other useful format, may be provided in such a content identification report for use in identifying the query content.

The operation of the sequence detector 304, as illustrated in FIG. 3a, is further described below with reference to the following illustrative example and the exemplary trellis configuration 210 (see FIG. 2b). In this example, the set of states correspond to the reference frames that are deemed to match at least some of the respective query frames Q1, Q2, Q3, Q4, Q5, Q6, based at least on the results of frame-level fingerprint matching. For example, with reference to FIG. 2b, the set of states $\{A_4, B_9, C_{10}, D_2, Y_u\}$ correspond to the reference frame matches for the first query frame Q1, and the set of states $\{B_8, A_5, C_{11}, Y_u\}$ correspond to the reference frame matches for the second query frame Q2, in which "$Y_u$" corresponds to an unknown reference frame. As discussed above, such an unknown reference frame $Y_u$ can be used to handle nonexistent reference frame matches, missing reference frame matches, and/or ambiguity. In this example, the sequence detector 304, implemented as a Viterbi sequence detector, determines, for the first query frame Q1, the probability $V_{1,k}$, in accordance with equation (11) above, in which the initial probability $\pi_k$ of each state k (k$\in\{A_4, B_9, C_{10}, D_2, Y_u\}$) is set to 1. Further, for the first query frame Q1 at the time step t=1, the sequence detector 304 determines the observation probability $P(x_i|k)$ with reference to each state k (k$\in\{A_4, B_9, C_{10}, D_2, Y_u\}$), based at least on the distance $d(x_i, F(k))$ between the query fingerprint $x_1$ for the first query frame Q1, and the reference fingerprints F(k) for the respective reference frames (k$\in\{A_4, B_9, C_{10}, D_2, Y_u\}$), in accordance with equation (16) above. For the second query frame Q2 at the time step t=2, the sequence detector 304 determines the probability $V_{2,k}$, in accordance with equation (12) above, in which the set of transition probabilities $a_{y,k}$ are determined with reference to the states y (y$\in\{A_4, B_9, C_{10}, D_2, Y_u\}$ corresponding to the first query frame, Q1), and the states k (k$\in\{B_8, A_5, C_{11}, Y_u\}$, corresponding to the second query frame, Q2). Further, for the second query frame Q2 at the time step t=2, the sequence detector 304 determines the observation probability $P(x_2|k)$ with reference to each state k (k$\in\{B_8, A_5, C_{11}, Y_u\}$), based at least on the distance $d(x_2, F(k))$ between the query fingerprint $x_2$ for the second query frame Q2, and the reference fingerprints F(k) for the respective reference frames (k$\in\{B_8, A_5, C_{11}, Y_u\}$), in accordance with equation (16) above. The sequence detector 304 also determines the probabilities $V_{t,k}$, in accordance with equation (12) above, and the observation probabilities $P(x_t|k)$, in accordance with equation (16) above, in a similar fashion for the remaining query frames Q3, Q4, Q5, Q6 at the time steps t=3, 4, 5, 6, respectively. Starting from the reference frame in the column corresponding to the query frame Q6 that has the highest probability of being the final frame in the most likely reference frame sequence, the sequence detector 304 traces back through the columns of the trellis configuration 210 to identify other reference frames in the respective columns that may be included in the most likely reference frame sequence. As discussed above, the most likely reference frame sequence can correspond to the sequence of reference frames that match at least some of the respective query frames Q1, Q2, Q3, Q4, Q5, Q6. For example, at the time step t=4, the sequence detector 304 can determine, in accordance with equation (13) above, the reference frame in the column of the trellis configuration 210 corresponding to the query frame Q4 that has the highest probability of being the final frame in the most likely reference frame sequence (e.g., the reference frame $A_7$). Further, the sequence detector 304 can trace back, in accordance with equation (14) above, through the columns of the trellis configuration 210 to identify other reference frames in the respective columns that may be included in the most likely reference frame sequence (e.g., the reference frames $A_4, A_5, A_6$). Accordingly, in this example, the most likely reference frame sequence includes the reference frames $A_4, A_5, A_6, A_7$, which match the query frames Q1, Q2, Q3, Q4, respectively.

Figure 3B:
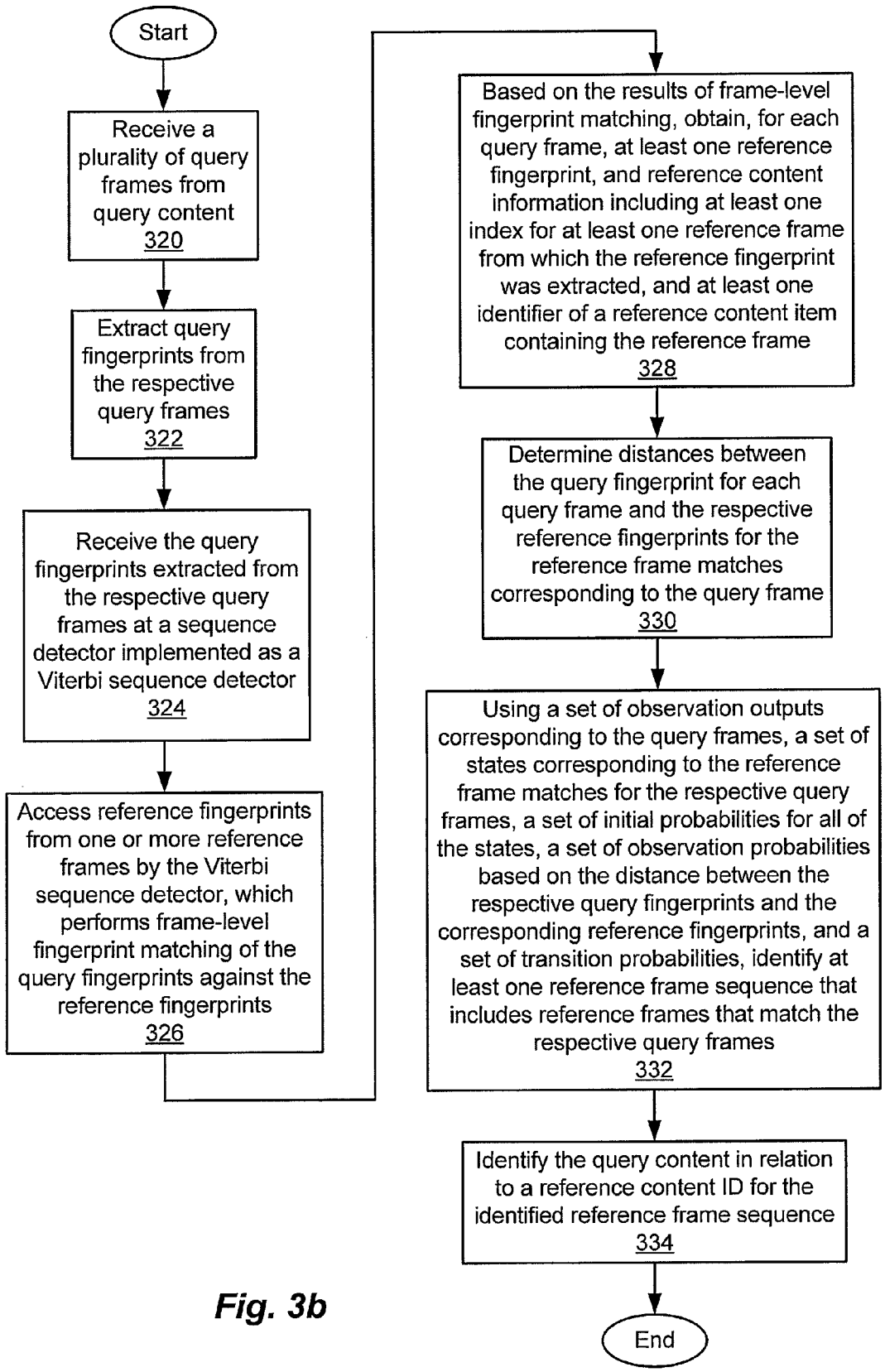

An exemplary method of operating the media content identification system 300 of FIG. 3a is described below with reference to FIG. 3b, as well as FIGS. 1 and 3a. In this exemplary method, the media content identification system 300 employs a hidden Markov model that includes a set of states, a set of initial probabilities and a set of transition probabilities for the set of states, a set of observation outputs, and a set of observation probabilities for the set of observation outputs. In this exemplary method, the set of observation outputs correspond to a plurality of query frames included in query content, and the set of states correspond to reference frames that are deemed to match the respective query frames, based at least on the results of frame-level fingerprint matching. Further, the set of initial probabilities for the set of states are each set to the same probability value, 1. As depicted in step 320 (see FIG. 3b), the plurality of query frames from the query content are received at the data collector/fingerprint extractor 302 (see FIG. 3a). As depicted in step 322 (see FIG. 3b), query fingerprints are extracted from the respective query frames by the data collector/fingerprint extractor 302. As depicted in step 324 (see FIG. 3b), the query fingerprints extracted from the respective query frames are received at the sequence detector 304 (see FIG. 3a), which is implemented as a Viterbi sequence detector. As depicted in step 326 (see FIG. 3b), reference fingerprints obtained from one or more reference frames, and stored in or otherwise accessible by or from the reference content database 112 (see FIG. 1), are accessed by the sequence detector 304, which performs frame-level fingerprint matching of the query fingerprints against reference fingerprints. As depicted in step 328 (see FIG. 3b), based on the results of frame-level fingerprint matching, at least one reference fingerprint, and reference content information including at least one index for at least one reference frame from which the reference fingerprint was extracted, and at least one identifier of a reference content item containing the reference frame, are obtained for each query frame from the reference content database 112 by the sequence detector 304. As depicted in step 330 (see FIG. 3b), distances are determined, by the sequence detector 304, between the query fingerprint for each query frame and the respective reference fingerprints for the reference frame matches corresponding to the query frame. In this exemplary method, the set of observation probabilities are based at least in part on the distances between the query fingerprints for the query frames and the respective reference fingerprints for the reference frame matches corresponding to the query frames. Further, the set of transition probabilities take into account possible transitions between one known/unknown reference content ID and another known/unknown reference content ID, and between one known/unknown reference frame index and another known/unknown reference frame index. As depicted in step 332 (see FIG. 3b), using at least the set of observation outputs corresponding to the query frames, the set of states corresponding to the reference frame matches for the respective query frames, the set of initial probabilities set to 1 for all of the states, the set of observation probabilities based at least on the distances between the respective query fingerprints and the corresponding reference fingerprints, and the set of transition probabilities taking into account possible transitions from one known or unknown reference content ID to another known or unknown reference content ID, and from one known or unknown reference frame index to another known or unknown reference frame index, at least one reference frame sequence, including the reference frames that match the respective query frames, is identified by the sequence detector 304. As depicted in step 334 (see FIG. 3b), the query content is identified, by the sequence detector 304, in relation to the reference content ID for the identified reference frame sequence.

Having described the above illustrative embodiments of the presently disclosed systems and methods of identifying media content, other alternative embodiments or variations may be made/practiced. For example, with reference to the media content identification system 200 of FIG. 2a, it was described that the confidence value generator 204 can obtain, for each reference frame sequence, a sequence confidence value $C_{s,N}$, in accordance with equation (3) above. In one or more alternative embodiments, for a predetermined temporal window corresponding to N successive query frames, Q1, Q2, ..., QN, the confidence value generator 204 can compute, calculate, determine, or otherwise obtain, for each reference frame sequence, a sequence confidence value $C_{s,N}$, in accordance with equation (23) below, $$C_{s,N} = \left(\frac{1}{N}\sum_{i=1}^{N} p_{s,i}\right) e^{-\beta \text{std}(\Delta t)}, \quad (23)$$

in which "β" is a predetermined parameter having a value greater than "0," "std" stands for the term "standard deviation," and "Δt" corresponds to the difference between time stamps for adjacent reference frame matches in the reference frame sequence. For example, with reference to equation (23) above, the predetermined parameter, β, can be set to 0.5, or any other suitable parameter value. Further, in one or more alternative embodiments, the term, $$\frac{\sum_{i=1}^{N} p_{s,i}}{N} \quad (24)$$

included in equations (3) and (23) above, can be replaced by the term, $$\frac{\sum_{i=1}^{N} \log p_{s,i}}{N}. \quad (25)$$

Moreover, in one or more alternative embodiments, to account for possible outliers, the confidence value generator 204 can exclude a predetermined percentage of the smallest frame confidence values, and/or a predetermined percentage of the largest frame confidence values, when determining the value of $C_{s,N}$. For example, such a predetermined percentage of the smallest frame confidence values may be set to about 5%, and such a predetermined percentage of the largest frame confidence values may be set to about 10%. In addition, in one or more alternative embodiments, to reduce the number of possible reference frame sequences, the confidence value generator 204 can be operative to retain only the reference frame matches for which the distances between the query fingerprint for a query frame and the reference fingerprints for reference frames fall below a predetermined distance threshold, and to discard the reference frame matches for which such distances are determined to be above the predetermined distance threshold.

With reference to the media content identification system 300 of FIG. 3a, it was described herein that the transition probabilities of the reference frames can be determined in accordance with exemplary transition probabilities, such as those provided in TABLE II above. In one or more alternative embodiments, if the indexes of the query frames and the reference frames correspond to time stamps for the respective frames, then such transition probabilities can be defined in a manner that is effectively agnostic of frame rate differences. For example, given the assumption that the time stamp differences between reference frame matches for two query frames are approximately equal to the time stamp difference between the two query frames, the transition probabilities trans(f, g) can be computed, calculated, determined, or otherwise obtained, in accordance with equation (26) below, $$\text{trans}(f,g) = e^{-\gamma(g-f-\Delta t s)}, \quad (26)$$

in which "f" and "g" correspond to the time stamps for the respective reference frames, "Δts" corresponds to the time stamp difference between the corresponding query frames, and "γ" is a predetermined parameter that can be set to 0.001, or any other suitable parameter value. In one or more further alternative embodiments, the transition probabilities trans(f, g) can be computed, calculated, determined, or otherwise obtained, in accordance with equation (27) below, $$trans(f, g) = \begin{cases} p_{trans}, & \text{if } |g - f - \Delta ts| < \varepsilon \\ 0, & \text{otherwise,} \end{cases} \quad (27)$$

in which "ε" is a predetermined parameter that can be set to 300 or any other suitable parameter value, and "$p_{trans}$" is a predetermined parameter that can be set to 0.99 or any other suitable parameter value. In one or more other alternative embodiments, if the indexes of the reference frames correspond to numerical values and the frame rate is unknown, then the transition probabilities trans(f, g) can be computed, calculated, determined, or otherwise obtained, in accordance with equation (28) below, $$trans(f, g) = \begin{cases} e^{-\beta(g-f)}, & 0 < (g - f) \le N \\ p_{far}, & (g - f) > N, \end{cases} \quad (28)$$

in which "$p_{far}$" is a predetermined parameter that can be set to 0 or any other suitable parameter value, and "N" is a predetermined parameter that can be set to 4 or any other suitable parameter value.

It is noted that, if the frame rate and the time stamp clock frequency are known, then the numerical values for the frame indexes can be converted to time stamps. It is further noted that, if frame numbers are used as frame indexes in equation (28) above, the expected spacing between consecutive matched frame indexes generally depends on the frame rate difference between the query content and the corresponding reference content item. If the query content has a lower frame rate than the corresponding reference content item, then such spacing is typically greater than 1. With reference to equation (28) above, a given frame index can transition to a greater frame index, assuming that the frame rate of the query content is more than 1/N times the frame rate of the corresponding reference content item.

With further reference to the media content identification system 300, in one or more alternative embodiments, a two-pass approach may be employed. For example, the media content identification system 300 may be operative, in a first pass, to identify a most likely reference content ID for the query content, and to discard all reference frame matches having reference content IDs that are different from the most likely reference content ID. Further, in a second pass, the media content identification system 300 may be operative to trace back through the columns of the trellis configuration 210 to identify other reference frames, each having a reference content ID that is the same as the most likely reference content ID, that may be included in the most likely reference frame sequence. Moreover, to reduce memory requirements, the media content identification system 300 may be operative to retain information for the function Ptr(k, t) (see equation (14) above) for a predetermined number of past query frames, rather than retaining such information for the entire history of a query frame sequence. The media content identification system 300 can also be configured to retrieve the state y (see equation (12) above) for selected ones of the query frames (e.g., one or more I-frames, and/or one or more query frames that may be unaffected by packet loss), and to employ the reference content ID for the most likely reference frame sequence and the reference frame index from the last such retrieval of the state y (see equation (12) above) to verify expected results for the remaining query frames. In addition, the media content identification system 300 can be configured to predict one or more reference frame matches for a query frame using at least the observed results for one or more previous query frames. For example, for a first query frame having a time stamp, $qt_1$, the media content identification system 300 may identify a reference frame match having a time stamp, $rt_1$, from a reference content item having a reference content ID, s. Further, for the next query frame having a time stamp, $qt_2$, the media content identification system 300 may add, to the reference frame matches, the next expected reference frame having a time stamp, $rt_1+qt_2-qt_1$, from the reference content item having the reference content ID, s.

With reference to the media content identification systems 200 and/or 300, in one or more alternative embodiments, any suitable watermarks, signatures, and/or identifiers associated with the query content and the reference content items may be employed in place of, or in addition to, the characteristic video fingerprint data extracted from the query content and the reference content items. Further, the media content identification systems 200 and/or 300 may be configured to handle video content, audio content, image content, text content, or any other suitable media content, in any suitable units including, but not being limited to, media frames such as video frames, audio frames, image frames, and text frames. For example, the media content identification systems 200 and/or 300 may be operative to perform real-time audio content identification, based at least on audio fingerprint matching for one or more seconds of query audio content. Moreover, the number of states to be processed by the media content identification systems 200 and/or 300 at each time step can be bounded. For example, the media content identification systems 200 and/or 300 can be configured to process a predetermined number, M, of reference frame matches for each query frame, and employ the unknown reference frame, $Y_u$, for any remaining reference frame matches. It is possible, however, that the number of matches for a particular query frame may exceed the predetermined number, M, of reference frame matches; such a situation can be handled by using M reference frame matches with the smallest reference frame indexes, or by selecting M reference frame matches from among the matches for the query frame. Further, because such matches for a query frame can occur within a contiguous video frame range, the media content identification systems 200 and/or 300 may be configured to store contiguous reference frames with the same reference fingerprints as a single indexed entity in the reference content database 112 (see FIG. 1). In such a case, a finite transition-to-self probability, and a mapping between the indexes of the reference content database and the actual range of the reference frames, may be required.

It is noted that the operations depicted and/or described herein are purely exemplary, and imply no particular order. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer. In particular, various general-purpose machines employing one or more processors coupled to one or more computer readable media can be used with computer programs written in accordance with the teachings disclosed herein, or it may be more convenient to construct a more specialized apparatus to perform the required operations.

The presently disclosed systems and methods can also be embodied as computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and/or any other suitable optical or non-optical data storage devices. The computer readable media can also be distributed over a network-coupled computer system, so that the computer readable code can be stored and/or executed in a distributed fashion.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of identifying media content, the media content including a plurality of media frames, comprising the steps of:
   obtaining query fingerprint data from the plurality of media frames, the query fingerprint data being characteristic of the media content;
   obtaining, from a reference content database, reference fingerprint data corresponding to the query fingerprint data from a plurality of reference frames, the reference fingerprint data being characteristic of reference content associated with the plurality of reference frames;
   obtaining, for each of at least some of the plurality of reference frames, a frame confidence value as an exponential function of a distance between the reference frame and a corresponding one of the plurality of media frames, the frame confidence value being indicative of how well the reference frame matches the corresponding one of the plurality of media frames, the at least some of the plurality of reference frames being associated with at least one of a plurality of reference frame sequences;
   obtaining, for at least one of the plurality of reference frame sequences, a sequence confidence value based at least on the frame confidence value for each of at least some of the plurality of reference frames associated with the reference frame sequence; and
   identifying the media content in relation to at least one reference content identifier for at least one of the plurality of reference frame sequences, based at least on the sequence confidence value for the reference frame sequence.

2. A method of identifying media content, the media content including a plurality of media frames, comprising the steps of:
   obtaining query fingerprint data from the plurality of media frames, the query fingerprint data being characteristic of the media content;
   obtaining, at a Viterbi sequence detector from a reference content database, reference fingerprint data corresponding to the query fingerprint data from a plurality of reference frames, the reference fingerprint data being characteristic of reference content associated with the plurality of reference frames, at least some of the plurality of reference frames being associated with at least one of a plurality of reference frame sequences; and
   identifying, on a per-frame basis by the Viterbi sequence detector, at least one reference frame sequence from among the plurality of reference frame sequences using a hidden Markov model that includes a set of states, a set of observation outputs, a set of initial probabilities for the set of states, a set of transition probabilities for the set of states, and a set of observation probabilities for the set of observation outputs, the identified reference frame sequence including one or more reference frames that match one or more of the respective media frames, the set of observation outputs corresponding to the respective media frames, the set of states corresponding to the reference frames that match the respective media frames, the set of states including an undefined reference frame, and the set of transition probabilities for the set of states including one or more transition probabilities for the undefined reference frame; and
   defining the set of transition probabilities for the set of states such that if $i = Y_u$ and $j = Y_{u'}$, then $a_{i,j} = p_{uu'}$, if $i = Y_u$ and $j = M_f$, then $a_{i,j} = p_{uk}$, if $i = M_f$ and $j = Y_u$, then $a_{i,j} = p_{ku}$, if $i = M_f$, $j = N_g$, and $M \neq N$, then $a_{i,j} = p_{MN}$, and if $i = M_f$ and $j = M_g$, then $a_{i,j} = \text{trans}(f, g)$, wherein (1) "$a_{i,j}$" corresponds to one of the respective transition probabilities, (2) "i" corresponds to a first match between a reference frame and a media frame at a time step, t, (3) "j" corresponds to a second match between a reference frame and a media frame at a time step, t+1, (4) "M" corresponds to a first predetermined reference content identifier, (5) "N" corresponds to a second predetermined reference content identifier, the second predetermined reference content identifier, N, being different from the first predetermined reference content identifier, M, (6) "f" corresponds to a first reference frame index, (7) "g" corresponds to a second reference frame index, the second reference frame index, g, being different from the first reference frame index, f, (8) "$Y_u$" corresponds to an undefined reference frame having an undefined reference content identifier, Y, and an undefined reference frame index, u, (9) "$Y_{u'}$" corresponds to an undefined reference frame having an undefined reference content identifier, Y, and an undefined reference frame index, u', (10) "$p_{uu'}$" corresponds to a first transition probability from one undefined reference frame, $Y_u$, to another undefined reference frame, $Y_{u'}$, (11) "$p_{uk}$" corresponds to a second transition probability from the undefined reference frame, $Y_u$, to a first defined reference frame, $M_f$, (12) "$p_{ku'}$" corresponds to a third transition probability from the first defined reference frame, $M_f$, to the undefined reference frame, $Y_{u'}$, (13) "$p_{MN}$" corresponds to a fourth transition probability from the first predetermined reference content identifier, M, to the second predetermined reference content identifier, N, and (14) "trans(f, g)" corresponds to a fifth transition probability from the first reference frame index, f, to the second reference frame index, g, each of the first reference frame index, f, and the second reference frame index, g, being associated with the same reference content identifier, M.

3. A system for identifying media content, the media content including a plurality of media frames, comprising:
a fingerprint extractor operative to extract query fingerprint data from the plurality of media frames, the query fingerprint data being characteristic of the media content; and
a confidence value generator operative:
to obtain, from a reference content database, reference fingerprint data corresponding to the query fingerprint data from a plurality of reference frames, the reference fingerprint data being characteristic of reference content associated with the plurality of reference frames;
to obtain, for each of at least some of the plurality of reference frames, a frame confidence value as an exponential function of a distance between the reference frame and a corresponding one of the plurality of media frames, the frame confidence value being indicative of how well the reference frame matches the corresponding one of the plurality of media frames, the at least some of the plurality of reference frames being associated with at least one of a plurality of reference frame sequences; and
to obtain, for at least one of the plurality of reference frame sequences, a sequence confidence value based at least on the frame confidence value for each of at least some of the plurality of reference frames associated with the reference frame sequence.

4. A system for identifying media content, the media content including a plurality of media frames, comprising:
a fingerprint extractor operative to extract query fingerprint data from the plurality of media frames, the query fingerprint data being characteristic of the media content; and
a Viterbi sequence detector operative:
to obtain, from a reference content database, reference fingerprint data corresponding to the query fingerprint data from a plurality of reference frames, the reference fingerprint data being characteristic of reference content associated with the plurality of reference frames, at least some of the plurality of reference frames being associated with at least one of a plurality of reference frame sequences; and
to identify, on a per-frame basis, at least one reference frame sequence from among the plurality of reference frame sequences using a hidden Markov model that includes a set of states, a set of observation outputs, a set of initial probabilities for the set of states, a set of transition probabilities for the set of states, and a set of observation probabilities for the set of observation outputs, the identified reference frame sequence including one or more reference frames that match one or more of the respective media frames,
wherein the set of observation outputs corresponds to the respective media frames,
wherein the set of states corresponds to the reference frames that match the respective media frames,
wherein the set of states includes an undefined reference frame,
wherein the set of transition probabilities for the set of states includes one or more transition probabilities for the undefined reference frame, and
wherein the set of transition probabilities for the set of states is defined such that if $i=Y_u$ and $j=Y_{u'}$, then $a_{i,j}=p_{uu'}$, if $i=Y_u$ and $j=M_f$, then $a_{i,j}=p_{uk}$, if $i=M_f$ and $j=Y_u$, then $a_{i,j}=p_{ku}$, if $i=M_f$, $j=N_g$, and $M \neq N$, then $a_{i,j}=p_{MN}$, and if $i=M_f$ and $j=M_g$, then $a_{i,j}=\text{trans}(f,g)$, wherein (1) "$a_{i,j}$" corresponds to one of the respective transition probabilities, (2) "i" corresponds to a first match between a reference frame and a media frame at a time step, t, (3) "j" corresponds to a second match between a reference frame and a media frame at a time step, t+1, (4) "M" corresponds to a first predetermined reference content identifier, (5) "N" corresponds to a second predetermined reference content identifier, the second predetermined reference content identifier, N, being different from the first predetermined reference content identifier, M, (6) "f" corresponds to a first reference frame index, (7) "g" corresponds to a second reference frame index, the second reference frame index, g, being different from the first reference frame index, f, (8) "$Y_u$" corresponds to an undefined reference frame having an undefined reference content identifier, Y, and an undefined reference frame index, u, (9) "$Y_{u'}$" corresponds to an undefined reference frame having an undefined reference content identifier, Y, and an undefined reference frame index, u', (10) "$p_{uu'}$" corresponds to a first transition probability from one undefined reference frame, $Y_u$, to another undefined reference frame, $Y_{u'}$, (11) "$p_{uk}$" corresponds to a second transition probability from the undefined reference frame, $Y_u$, to a first defined reference frame, $M_f$, (12) "$p_{ku'}$" corresponds to a third transition probability from the first defined reference frame, $M_f$, to the undefined reference frame, $Y_{u'}$, (13) "$p_{MN}$" corresponds to a fourth transition probability from the first predetermined reference content identifier, M, to the second predetermined reference content identifier, N, and (14) "trans(f, g)" corresponds to a fifth transition probability from the first reference frame index, f, to the second reference frame index, g, each of the first reference frame index, f, and the second reference frame index, g, being associated with the same reference content identifier, M.

5. The method of claim 1 wherein the obtaining of the sequence confidence value comprises:
obtaining the sequence confidence value over a predetermined temporal window.

6. The method of claim 1 wherein the obtaining of the frame confidence value comprises:
obtaining the frame confidence value based at least on a predetermined metric that is associated with the query fingerprint data and with the reference fingerprint data, the predetermined metric corresponding to a predetermined distance metric.

7. The method of claim 2 further comprising:
identifying the media content in relation to at least one reference content identifier and at least one reference frame index for the identified reference frame sequence.

8. The method of claim 2 wherein the defining of the set of transition probabilities for the set of states comprises:
defining the fifth transition probability such that $$trans(a,b) = e^{-\gamma(b-a-\Delta ts)}$$

wherein "a" corresponds to a first time stamp associated with a first one of the reference frames, the first one of the reference frames matching a first one of the media frames;
"b" corresponds to a second time stamp associated with a second one of the reference frames, the second one of the reference frames matching a second one of the media frames;
"Δts" corresponds to a difference between a value of the time stamp associated with the first one of the media frames and a value of the time stamp associated with the second one of the media frames; and,
"γ" corresponds to a predetermined parameter.

9. The method of claim 2 wherein the defining of the set of transition probabilities for the set of states comprises:
defining the fifth transition probability such that $$trans(a,b) = \begin{cases} p_{trans}, & \text{if } |b-a-\Delta ts| < \varepsilon \\ 0, & \text{otherwise,} \end{cases}$$

wherein "a" corresponds to a first time stamp associated with a first one of the reference frames, the first one of the reference frames matching a first one of the media frames;
"b" corresponds to a second time stamp associated with a second one of the reference frames, the second one of the reference frames matching a second one of the media frames;
"Δts" corresponds to a difference between a value of the time stamp associated with the first one of the media frames and a value of the time stamp associated with the second one of the media frames;
"$p_{trans}$" corresponds to a first predetermined parameter, and
"ε" corresponds to a second predetermined parameter.

10. The method of claim 2 wherein the defining of the set of transition probabilities for the set of states comprises:
defining the fifth transition probability such that $$trans(a,b) = \begin{cases} e^{-\beta(b-a)}, & 0 < (b-a) \leq Q \\ p_{far}, & (b-a) > Q, \end{cases}$$

wherein "a" corresponds to a first frame index, "b" corresponds to a second frame index, "$p_{far}$" corresponds to a first predetermined parameter, "β" corresponds to a second predetermined parameter having a value greater than zero, and "Q" corresponds to a third predetermined parameter, and wherein each of the first frame index, a, and the second frame index, b, is associated with a respective one of the reference frames that match the respective media frames.

11. The method of claim 2 further comprising:
setting the initial probabilities for the set of states to a predetermined probability value.

12. The method of claim 2 further comprising:
basing the set of initial probabilities for the set of states at least on a predetermined relationship between reference frame indexes for the respective media frames, and reference frame indexes for the reference frames that match the respective media frames.

13. The method of claim 2 further comprising:
basing the set of observation probabilities for the set of observation outputs at least on a predetermined metric that is associated with the query fingerprint data and with the reference fingerprint data.

14. The method of claim 2 wherein the identifying of the at least one reference frame sequence from among the plurality of reference frame sequences comprises:
determining a first probability of a sequence of the set of states having produced the set of observation outputs, $x_1, \ldots, x_t$, in accordance with a first set of equations, $$V_{1,k} = P(x_1 \mid k)\pi_k,$$

and $$V_{t,k} = P(x_t \mid k)\max_{y \in Y}(a_{y,k}, V_{t-1,y}),$$

wherein (1) "Y" corresponds to the set of states, (2) "y" corresponds to a respective state within the set of states, (3) "k" represents a final state of the sequence of the set of states up to a corresponding time step, t=1, ..., T, (4) "$x_1$" corresponds to a first observation output at a corresponding time step, t=1, (5) "$x_t$" corresponds to an observation output at the corresponding time step, t, (6) "$\pi_k$" corresponds to an initial probability of the final state, k, at a time step, t, equal to one, (7) "$V_{1,k}$" corresponds to the first probability associated with the first observation output, $x_1$, at the corresponding time step, t=1, and the final state, k, (8) "$V_{t,k}$" corresponds to the first probability associated with the observation output, $x_t$, at the corresponding time step, t, and the final state, k, (9) "$P(x_1 \mid k)$" corresponds to the observation probability for the first observation output, $x_1$, associated with the final state, k, at the time step, t, equal to one, and (10) "$P(x_t \mid k)$" corresponds to the observation probability for the observation output, $x_t$, associated with the final state, k, at the time step, t, and wherein the sequence of the set of states corresponds to the identified reference frame sequence, and the set of observation outputs, $x_1, \ldots, x_t$, correspond to the query fingerprint data obtained from the respective media frames.

15. The system of claim 3 wherein the confidence value generator is further operative to identify the media content in relation to at least one reference content identifier for at least one of the plurality of reference frame sequences, based at least on the sequence confidence value for the reference frame sequence.

16. The system of claim 4 wherein the Viterbi sequence detector is further operative to identify the media content in relation to at least one reference content identifier and at least one reference frame index for the identified reference frame sequence.

17. The method of claim 5 further comprising:
defining the predetermined temporal window in relation to a media frame sequence including more than one of the plurality of media frames.

18. The method of claim 6 wherein the predetermined distance metric corresponds to an Euclidean distance metric.

19. The method of claim 6 wherein the obtaining of the frame confidence value as the exponential function of the distance between the reference frame and the corresponding one of the plurality of media frames includes obtaining the frame confidence value in accordance with a first equation, $$p_{s,i} = e^{-\alpha d_{s,i}},$$

wherein "$p_{s,i}$" corresponds to the frame confidence value, "s" corresponds to the reference content identifier for the respective reference frame sequence, "i" corresponds to a frame index for the corresponding one of the plurality of media frames, "$\alpha$" corresponds to a predetermined parameter value, and "$d_{s,i}$" corresponds to a value that is based on the distance between the reference frame and the corresponding one of the plurality of media frames.

20. The method of claim 13 wherein the predetermined metric corresponds to a predetermined distance metric.

21. The method of claim 14 wherein the identifying of the at least one reference frame sequence from among the plurality of reference frame sequences further comprises:
determining the at least one reference frame sequence in accordance with a set of second equations, $$y_T = \arg\max_{y \in Y}(V_{T,y}), \text{ and}$$

$$y_{t-1} = Ptr(y_t, t),$$

wherein (1) "$y_t$" corresponds to a respective state within the set of states at a corresponding time step, T, (2) "$y_{t-1}$" corresponds to a respective state within the set of states at a corresponding time step, t−1, (3) "$y_t$" corresponds to a respective state within the set of states at a corresponding time step, t, (4) "$V_{T,y}$" corresponds to the first probability associated with an observation output, $x_t$, at the corresponding time step, T, and a final state, y, and (5) "$Ptr(y_t, t)$" corresponds to a function returning a value of a state, $y_{t-1}$, used to compute $V_{t,k}$ if the time step, t, is greater than 1, or a value of a state, $y_t$, if the time step, t, is equal to 1.

22. The method of claim 19 wherein the obtaining of the sequence confidence value comprises:
obtaining, over a predetermined temporal window defined by a media frame sequence including a predetermined number, N, of the plurality of media frames, the sequence confidence value in accordance with a second equation, $$C_{s,N} = \frac{1}{N} \sum_{i=1}^{N} p_{s,i},$$

wherein "$C_{s,N}$" corresponds to the sequence confidence value.

23. The method of claim 19 wherein the obtaining of the sequence confidence value comprises:
obtaining, over a predetermined temporal window defined by a media frame sequence including a predetermined number, N, of the plurality of media frames, the sequence confidence value in accordance with a second equation, $$C_{s,N} = \frac{1}{N} \sum_{i=1}^{N} \log p_{s,i},$$

wherein "$C_{s,N}$" corresponds to the sequence confidence value.

24. The method of claim 19 wherein the obtaining of the sequence confidence value comprises:
obtaining, over a predetermined temporal window defined by a media frame sequence including a predetermined number, N, of the plurality of media frames, the sequence confidence value in accordance with a second equation, $$C_{s,N} = \left(\frac{1}{N} \sum_{i=1}^{N} p_{s,i}\right) e^{-\beta std(\Delta t)},$$

wherein "$C_{s,N}$" corresponds to the sequence confidence value, "$\beta$" corresponds to a predetermined parameter having a value greater than zero, "std" stands for "standard deviation," and "$\Delta t$" corresponds to a difference between time stamp values for adjacent respective reference frames in the respective reference frame sequence.

25. The method of claim 19 wherein the obtaining of the sequence confidence value comprises:
obtaining, over a predetermined temporal window defined by a media frame sequence including a predetermined number, N, of the plurality of media frames, the sequence confidence value in accordance with a second equation, $$C_{s,N} = \left(\frac{1}{N} \sum_{i=1}^{N} \log p_{s,i}\right) e^{-\beta std(\Delta t)},$$

wherein "$C_{s,N}$" corresponds to the sequence confidence value, "$\beta$" corresponds to a predetermined parameter having a value greater than zero, "std" stands for "standard deviation," and "$\Delta t$" corresponds to a difference between frame index values for adjacent respective reference frames in the respective reference frame sequence.

26. The method of claim 20 wherein the predetermined distance metric corresponds to an Euclidean distance metric.

27. The method of claim 21 wherein the identifying of the at least one reference frame sequence from among the plurality of reference frame sequences further comprises:
determining the set of observation probabilities, $P(x_t|k)$, in accordance with a third equation, $$P(x_t | k) = \begin{cases} \frac{1}{K} e^{-\alpha d(x_t, F(k))}, & k = M_f \\ \frac{1}{K} e^{-\alpha D}, & k = Y_u, \end{cases}$$

wherein (1) "K" corresponds to a predetermined normalization factor, (2) "$d(x_t, F(k))$" corresponds to a distance between the observation output, $x_t$, at the corresponding time step, t, and the reference fingerprint data, F(k), associated with a corresponding state, k, within the set of states, (3) "D" corresponds a predetermined distance value, (4) "α" corresponds a predetermined parameter that controls a rate at which the observation probabilities, $P(x_1|k)$, decrease with the distance, $d(x_r,F(k))$, (5) "$M_f$" corresponds to a defined reference frame, and (6) "$Y_u$" corresponds to an undefined reference frame.

28. The method of claim 25 wherein the frame index values correspond to time stamp values for the adjacent respective reference frames in the respective reference frame sequence.

29. The method of claim 27 wherein the distance, $d(x_r,F(k))$, corresponds to an Euclidean distance.

30. The method of claim 27 wherein the identifying of the at least one reference frame sequence from among the plurality of reference frame sequences further comprises:

obtaining a confidence value, $C_T$, for the reference frame sequence, in accordance with a fourth equation, $C_T = \max_y V_{T,y}.$

* * * * *